United States Patent
MacInnis

(10) Patent No.: US 9,295,076 B2
(45) Date of Patent: Mar. 22, 2016

(54) SELECTIVE INTRA AND/OR INTER PREDICTION VIDEO ENCODING BASED ON A CHANNEL RATE

(75) Inventor: Alexander G. MacInnis, Los Altos, CA (US)

(73) Assignee: BROADCOM CORPORATION, Irvine, CA (US)

(*) Notice: Subject to any disclaimer, the term of this patent is extended or adjusted under 35 U.S.C. 154(b) by 293 days.

(21) Appl. No.: 13/240,906

(22) Filed: Sep. 22, 2011

(65) Prior Publication Data

US 2012/0307884 A1    Dec. 6, 2012

Related U.S. Application Data

(60) Provisional application No. 61/491,838, filed on May 31, 2011.

(51) Int. Cl.
*H04N 7/26* (2006.01)
*H04W 72/12* (2009.01)
*H04W 72/04* (2009.01)

(52) U.S. Cl.
CPC ...... *H04W 72/1242* (2013.01); *H04W 72/1252* (2013.01); *H04W 72/1278* (2013.01); *H04W 72/0486* (2013.01); *H04W 72/12* (2013.01); *H04W 72/1268* (2013.01); *Y02B 60/50* (2013.01)

(58) Field of Classification Search
CPC ............ H04W 72/04; H04W 72/0486; H04W 72/1252; H04W 72/1278; H04W 72/1242; H04W 72/1268; H04W 72/12; Y02B 60/50
USPC ........................ 375/240.02, 240.13
See application file for complete search history.

(56) References Cited

U.S. PATENT DOCUMENTS 5,260,783 A * 11/1993 Dixit ........................ 375/240.13
6,198,500 B1 * 3/2001 Watanabe et al. ............. 725/105

(Continued)

FOREIGN PATENT DOCUMENTS

WO    2009084896 A2    7/2009

OTHER PUBLICATIONS

European Patent Office; EP Search Report; EP Application No. 12003862.5; Sep. 28, 2012; 3 pgs.

*Primary Examiner* — Jay Patel
*Assistant Examiner* — Joseph Suh
(74) *Attorney, Agent, or Firm* — Garlick & Markison; Kevin L. Smith

(57) ABSTRACT

Selective intra and/or inter-prediction video encoding. Based upon anticipation of a future communication channel rate (e.g., actual physical layer channel rate) or video data rate of a communication channel, a given prediction mode for video encoding may be adaptively selected. Prediction of a future or expected value corresponding to at least one parameter associated with the communication channel (e.g., channel rate, video data rate, etc.) can drive operational mode selection/adaptation in accordance with video coding. Alternatively, one or more actual measured values corresponding to at least one parameter can drive operational mode selection/adaptation in accordance with video coding. In some instances, neither intra-prediction nor inter-prediction is performed in accordance with a non-feedback operational mode, and an input video signal undergoes compression (e.g., without intra-prediction and/or inter-prediction). Transitioning between various video coding operational modes may be made in different manners and based on different criteria as desired in various given applications.

20 Claims, 16 Drawing Sheets

(56) References Cited

U.S. PATENT DOCUMENTS

| | | | |
|---|---|---|---|
| 6,950,399 B1* | 9/2005 | Bushmitch et al. | 370/236 |
| 7,697,608 B2* | 4/2010 | Lee | 375/240.03 |
| 2001/0012324 A1* | 8/2001 | Normile | 375/240.05 |
| 2001/0031003 A1* | 10/2001 | Sawhney et al. | 375/240.14 |
| 2001/0040919 A1* | 11/2001 | An | 375/225 |
| 2002/0034263 A1* | 3/2002 | Schmidl et al. | 375/299 |
| 2003/0206588 A1* | 11/2003 | Etoh et al. | 375/240.13 |
| 2006/0095944 A1 | 5/2006 | Demircin et al. | |
| 2008/0075163 A1* | 3/2008 | Brydon et al. | 375/240.02 |
| 2009/0060045 A1* | 3/2009 | Tateno | 375/240.16 |
| 2009/0086689 A1* | 4/2009 | Hunt et al. | 370/338 |
| 2009/0185617 A1* | 7/2009 | Houghton et al. | 375/240.01 |
| 2010/0150226 A1* | 6/2010 | Hallapuro et al. | 375/240.03 |
| 2010/0296579 A1* | 11/2010 | Panchal et al. | 375/240.15 |
| 2011/0310735 A1* | 12/2011 | Karagiannis et al. | 370/232 |
| 2012/0236115 A1* | 9/2012 | Zhang et al. | 348/43 |
| 2012/0236931 A1* | 9/2012 | Karczewicz et al. | 375/240.02 |

\* cited by examiner

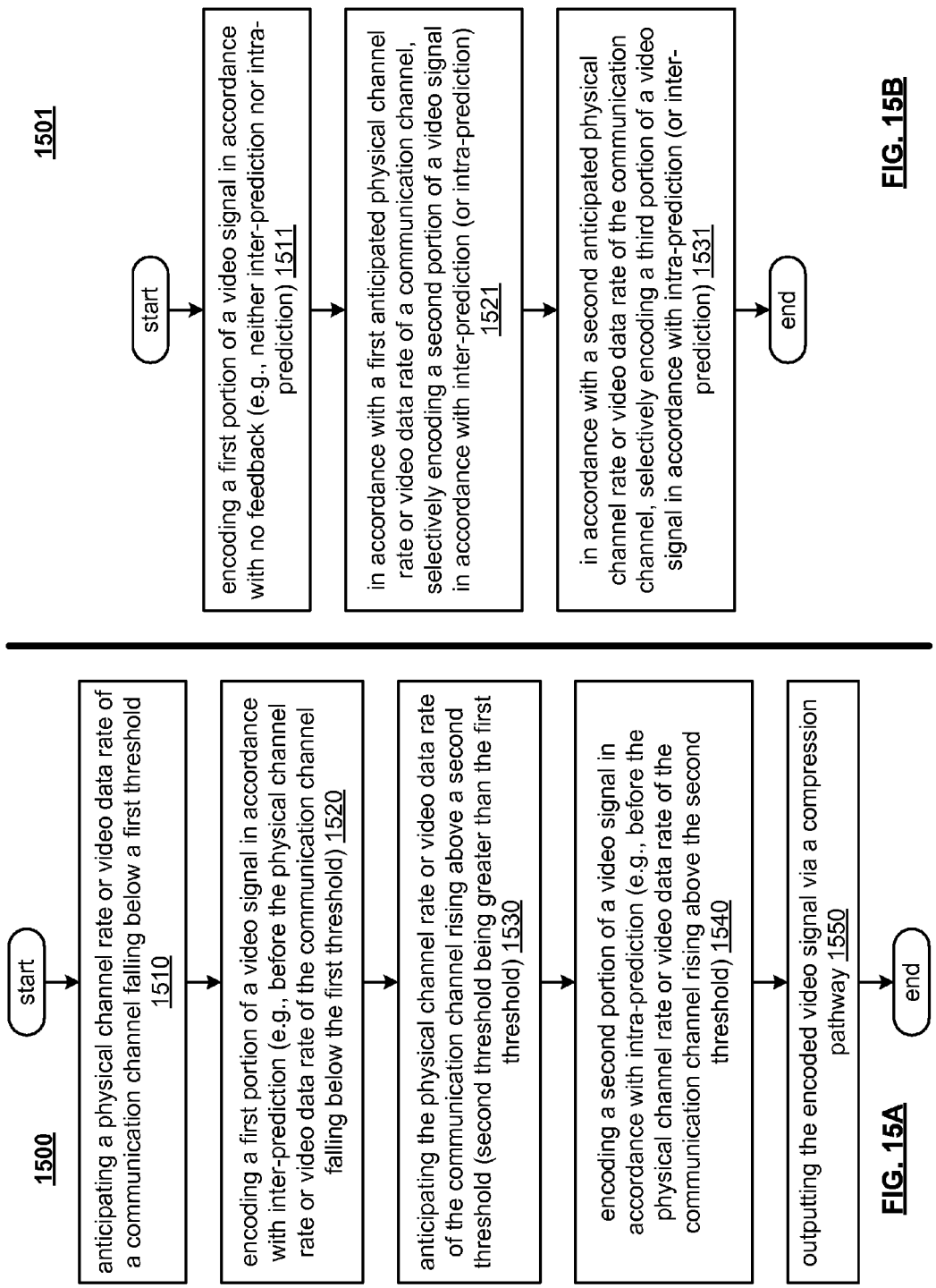

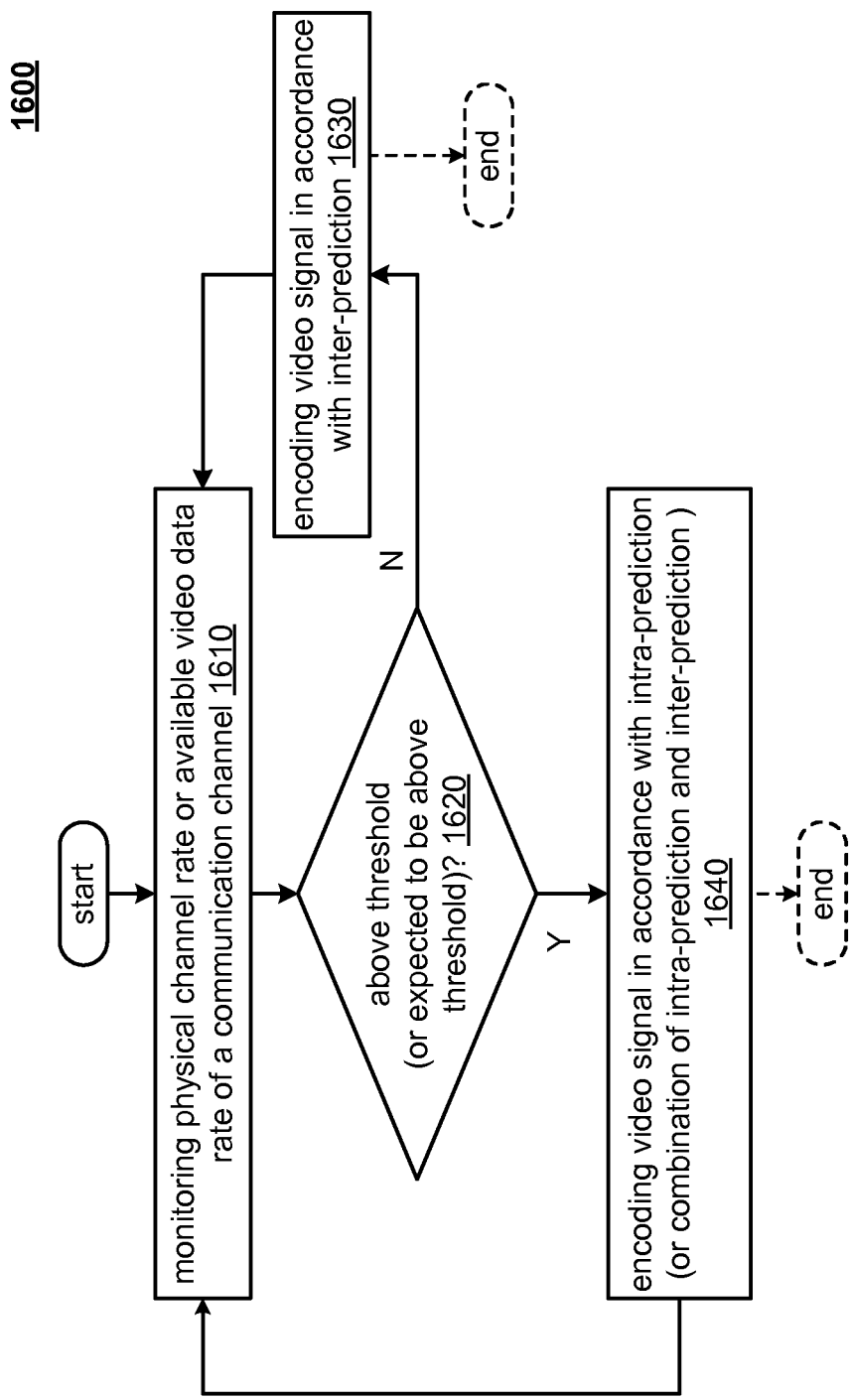

SELECTIVE INTRA AND/OR INTER PREDICTION VIDEO ENCODING BASED ON A CHANNEL RATE

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/491,838, entitled "Media communications and signaling within wireless communication systems," filed May 31, 2011, expired.

Incorporation By Reference

The following U.S. Utility Patent Application is hereby incorporated herein by reference in its entirety and made part of the present U.S. Utility Patent Application for all purposes:

1. U.S. Utility patent application Ser. No. 13/223,250, entitled "Dynamic wireless channel selection and protocol control for streaming media," filed on Aug. 31, 2011, pending, which claims priority pursuant to 35 U.S.C. §119(e) to the following U.S. Provisional Patent Application which is hereby incorporated herein by reference in its entirety and made part of the present U.S. Utility Patent Application for all purposes:

1.1. U.S. Provisional Patent Application Ser. No. 61/491,838, entitled "Media communications and signaling within wireless communication systems," filed May 31, 2011, expired.

Incorporation by Reference

The following standards/draft standards are hereby incorporated herein by reference in their entirety and are made part of the present U.S. Utility Patent Application for all purposes:

1. "WD3: Working Draft 3 of High-Efficiency Video Coding, Joint Collaborative Team on Video Coding (JCT-VC)," of ITU-T SG16 WP3 and ISO/IEC JTC1/SC29/WG11, Thomas Wiegand, et al., 5th Meeting: Geneva, CH, 16-23 Mar., 2011, Document: JCTVC-E603, 215 pages.

2. International Telecommunication Union, ITU-T, TELECOMMUNICATION STANDARDIZATION SECTOR OF ITU, H.264 (03/2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent.

Incorporation by Reference

The following IEEE standards/draft IEEE standards are hereby incorporated herein by reference in their entirety and are made part of the present U.S. Utility Patent Application for all purposes:

1. IEEE Std 802.11™—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™—2007, (Revision of IEEE Std 802.11-1999), 1233 pages.

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 pages.

3. IEEE P802.11ac™/D1.1, August 2011, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," Prepared by the 802.11 Working Group of the 802 Committee, 297 total pages (pp. i-xxiii, 1-274).

BACKGROUND OF THE INVENTION

1. Technical Field of the Invention

The invention relates generally to communication systems; and, more particularly, it relates to selecting prediction mode adaptively, in accordance with video encoding, based upon a future or anticipated change in channel communication rate.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier (PA). The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802, 11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), and particularly within communication devices that may employ multiple communication paths therein, the present art does not provide an adequate solution by which various communications maybe performed and operated in a communication device without deleterious affecting one another.

In the context of wireless communications and particularly the transmission and receipt of signals therein that include media content (e.g., video, audio, etc.), certain considerations should be made that are not necessary within non-media related signaling. For example, certain non-media related signals do not suffer significant degradation of performance from latency, delay, etc. Often times, such media related content communications are relatively more time critical than non-media related content communications. Particularly in the context of wireless communications, the present art does not provide an adequate means by which media related content communications may be effectuated in a robust, reliable, and perceptually acceptable manner.

BRIEF DESCRIPTION OF THE SEVERAL VIEWS OF THE DRAWINGS

FIG. 13A, FIG. 13B, FIG. 14A, FIG. 14B, FIG. 15A, FIG. 15B, and FIG. 16 illustrate various embodiments of methods as may be performed in accordance with operation of various devices such as various wireless communication devices operative to perform encoding of media signals and/or transmission within wireless communication systems and/or networks.

DETAILED DESCRIPTION OF THE INVENTION

Figure 1:
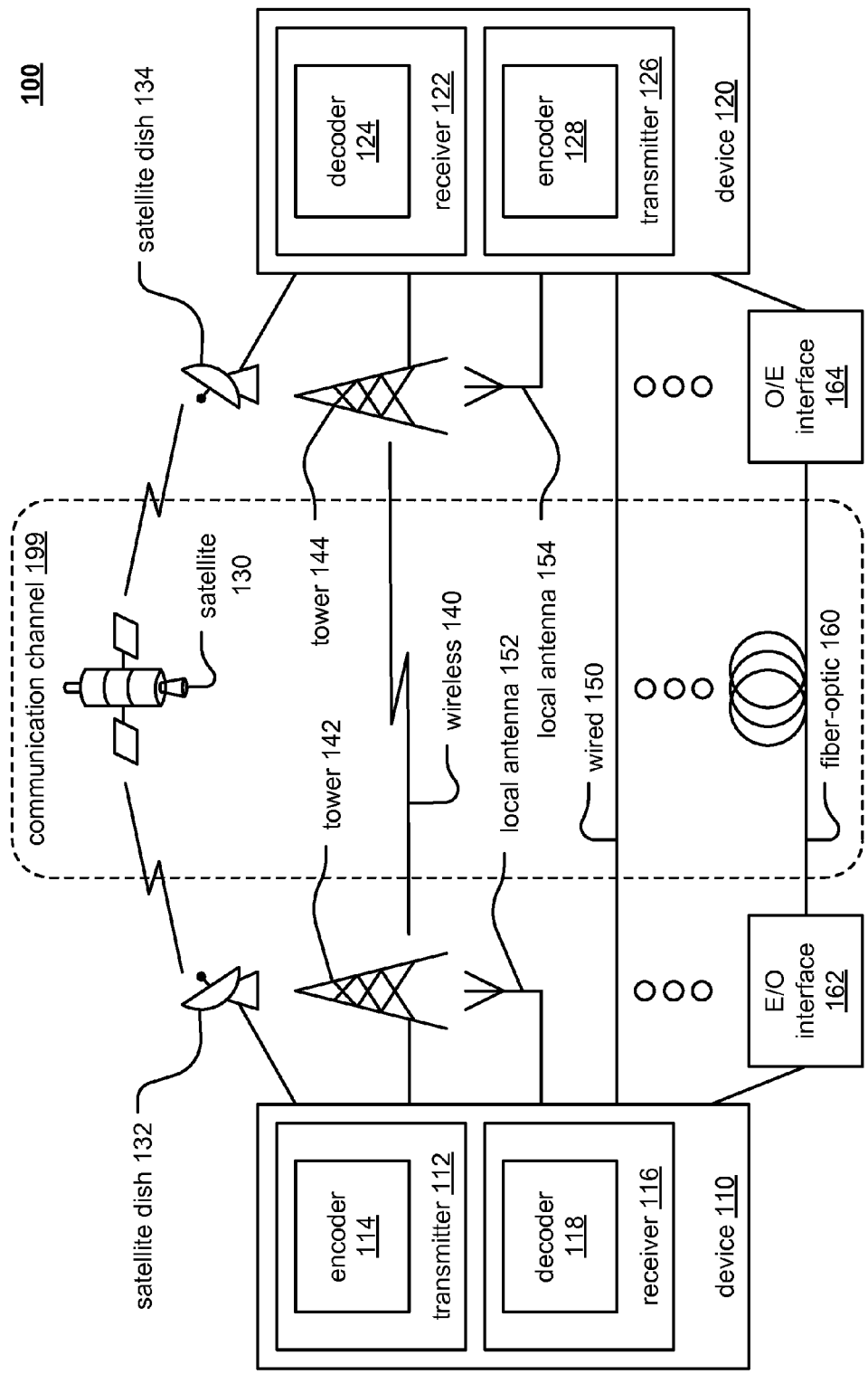
FIG. 1 and FIG. 2 are diagrams illustrating various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
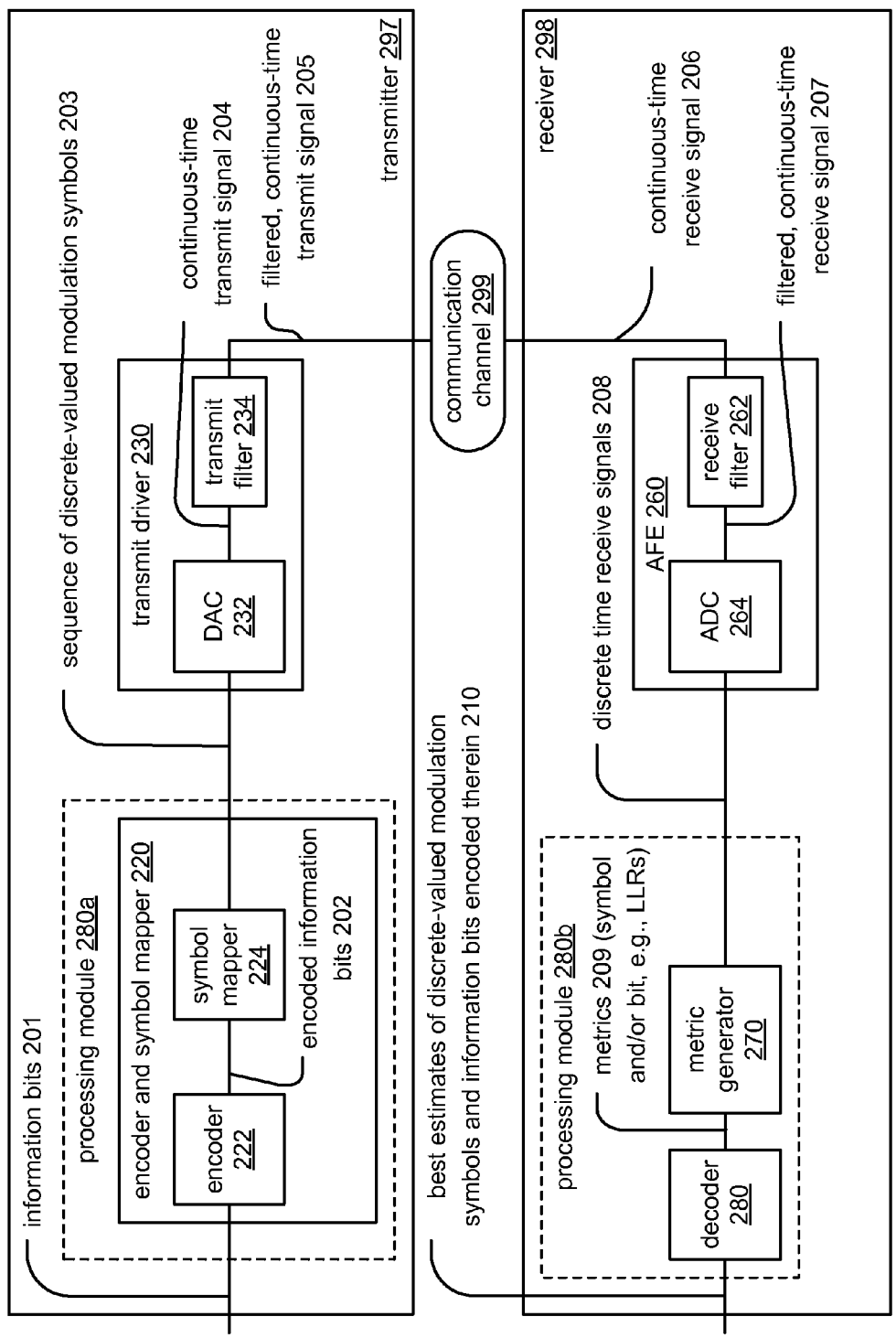

FIG. 1 and FIG. 2 are diagrams illustrating various embodiments of communication systems, 100, and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
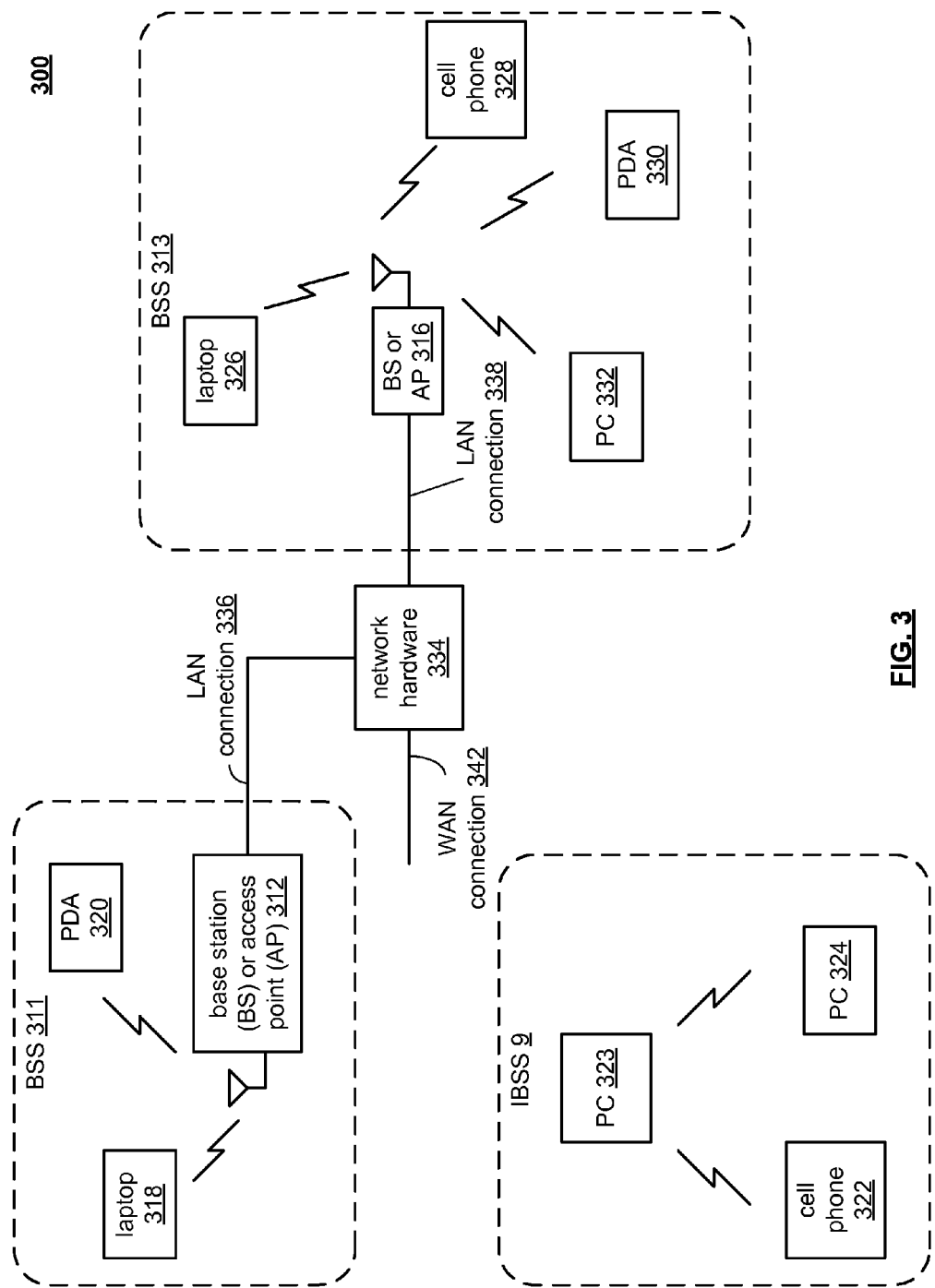
FIG. 3 is a diagram illustrating an alternative embodiment of a wireless communication system.

FIG. 3 is a diagram illustrating an embodiment of a wireless communication system 300. The wireless communication system 300 includes a plurality of base stations and/or access points 312, 316, a plurality of wireless communication devices 318-332 and a network hardware component 334. Note that the network hardware 334, which may be a router, switch, bridge, modem, system controller, etc., provides a wide area network connection 342 for the communication system 300. Further note that the wireless communication devices 318-332 may be laptop host computers 318 and 326, personal digital assistant hosts 320 and 330, personal computer hosts 324 and 332 and/or cellular telephone hosts 322 and 328.

Wireless communication devices 322, 323, and 324 are located within an independent basic service set (IBSS) area and communicate directly (i.e., point to point). In this configuration, these devices 322, 323, and 324 may only communicate with each other. To communicate with other wireless communication devices within the system 300 or to communicate outside of the system 300, the devices 322, 323, and/or 324 need to affiliate with one of the base stations or access points 312 or 316.

The base stations or access points 312, 316 are located within basic service set (BSS) areas 311 and 313, respectively, and are operably coupled to the network hardware 334 via local area network connections 336, 338. Such a connection provides the base station or access point 312-316 with connectivity to other devices within the system 300 and provides connectivity to other networks via the WAN connection 342. To communicate with the wireless communication devices within its BSS 311 or 313, each of the base stations or access points 312-116 has an associated antenna or antenna array. For instance, base station or access point 312 wirelessly communicates with wireless communication devices 318 and 320 while base station or access point 316 wirelessly communicates with wireless communication devices 326-332. Typically, the wireless communication devices register with a particular base station or access point 312, 316 to receive services from the communication system 300.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 4:
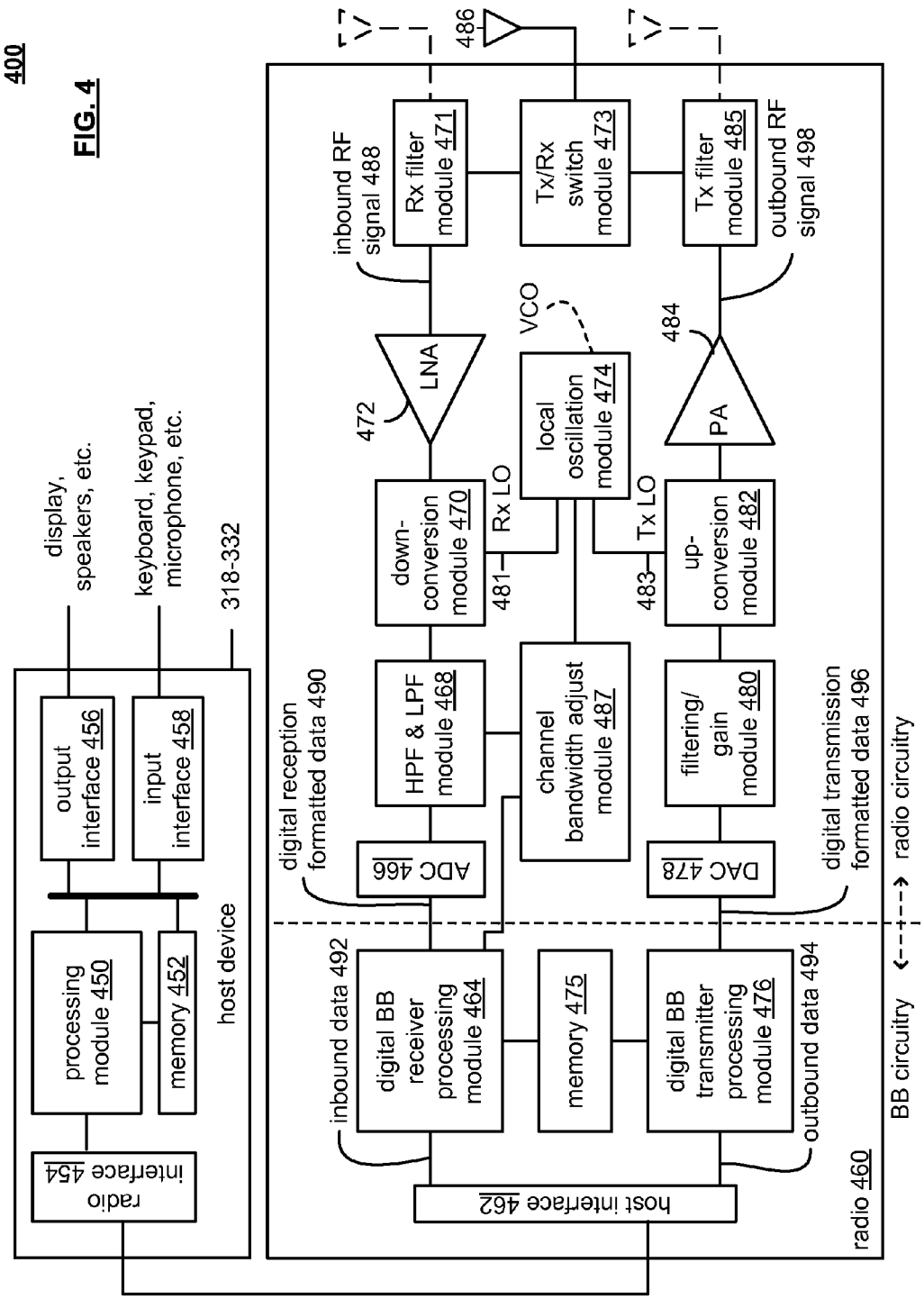
FIG. 4 is a diagram illustrating an embodiment of a wireless communication device.

FIG. 4 is a diagram illustrating an embodiment 300 of a wireless communication device that includes the host device 318-332 and an associated radio 460. For cellular telephone hosts, the radio 460 is a built-in component. For personal digital assistants hosts, laptop hosts, and/or personal computer hosts, the radio 460 may be built-in or an externally coupled component.

As illustrated, the host device 318-332 includes a processing module 450, memory 452, a radio interface 454, an input interface 458, and an output interface 456. The processing module 450 and memory 452 execute the corresponding instructions that are typically done by the host device. For example, for a cellular telephone host device, the processing module 450 performs the corresponding communication functions in accordance with a particular cellular telephone standard.

The radio interface 454 allows data to be received from and sent to the radio 460. For data received from the radio 460 (e.g., inbound data), the radio interface 454 provides the data to the processing module 450 for further processing and/or routing to the output interface 456. The output interface 456 provides connectivity to an output display device such as a display, monitor, speakers, etc., such that the received data may be displayed. The radio interface 454 also provides data from the processing module 450 to the radio 460. The processing module 450 may receive the outbound data from an input device such as a keyboard, keypad, microphone, etc., via the input interface 458 or generate the data itself. For data received via the input interface 458, the processing module 450 may perform a corresponding host function on the data and/or route it to the radio 460 via the radio interface 454.

Radio 460 includes a host interface 462, digital receiver processing module 464, an analog-to-digital converter 466, a high pass and low pass filter module 468, an IF mixing down conversion stage 470, a receiver filter 471, a low noise amplifier 472, a transmitter/receiver switch 473, a local oscillation module 474 (which may be implemented, at least in part, using a voltage controlled oscillator (VCO)), memory 475, a digital transmitter processing module 476, a digital-to-analog converter 478, a filtering/gain module 480, an IF mixing up conversion stage 482, a power amplifier 484, a transmitter filter module 485, a channel bandwidth adjust module 487, and an antenna 486. The antenna 486 may be a single antenna that is shared by the transmit and receive paths as regulated by the Tx/Rx switch 473, or may include separate antennas for the transmit path and receive path. The antenna implementation will depend on the particular standard to which the wireless communication device is compliant.

The digital receiver processing module 464 and the digital transmitter processing module 476, in combination with operational instructions stored in memory 475, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 464 and 476 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 475 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 464 and/or 476 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 460 receives outbound data 494 from the host device via the host interface 462. The host interface 462 routes the outbound data 494 to the digital transmitter processing module 476, which processes the outbound data 494 in accordance with a particular wireless communication standard (e.g., IEEE 802.11, Bluetooth, ZigBee, WiMAX (Worldwide Interoperability for Microwave Access), any other type of radio frequency based network protocol and/or variations thereof etc.) to produce outbound baseband signals 496. The outbound baseband signals 496 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 478 converts the outbound baseband signals 496 from the digital domain to the analog domain. The filtering/gain module 480 filters and/or adjusts the gain of the analog signals prior to providing it to the IF mixing stage 482. The IF mixing stage 482 converts the analog baseband or low IF signals into RF signals based on a transmitter local oscillation 483 provided by local oscillation module 474. The power amplifier 484 amplifies the RF signals to produce outbound RF signals 498, which are filtered by the transmitter filter module 485. The antenna 486 transmits the outbound RF signals 498 to a targeted device such as a base station, an access point and/or another wireless communication device.

The radio 460 also receives inbound RF signals 488 via the antenna 486, which were transmitted by a base station, an access point, or another wireless communication device. The antenna 486 provides the inbound RF signals 488 to the receiver filter module 471 via the Tx/Rx switch 473, where the Rx filter 471 bandpass filters the inbound RF signals 488. The Rx filter 471 provides the filtered RF signals to low noise amplifier 472, which amplifies the signals 488 to produce an amplified inbound RF signals. The low noise amplifier 472 provides the amplified inbound RF signals to the IF mixing module 470, which directly converts the amplified inbound RF signals into an inbound low IF signals or baseband signals based on a receiver local oscillation 481 provided by local oscillation module 474. The down conversion module 470 provides the inbound low IF signals or baseband signals to the filtering/gain module 468. The high pass and low pass filter module 468 filters, based on settings provided by the channel bandwidth adjust module 487, the inbound low IF signals or the inbound baseband signals to produce filtered inbound signals.

The analog-to-digital converter 466 converts the filtered inbound signals from the analog domain to the digital domain to produce inbound baseband signals 490, where the inbound baseband signals 490 will be digital base-band signals or digital low IF signals, where the low IF typically will be in the frequency range of one hundred kHz to a few MHz. The digital receiver processing module 464, based on settings provided by the channel bandwidth adjust module 487, decodes, descrambles, demaps, and/or demodulates the inbound baseband signals 490 to recapture inbound data 492 in accordance with the particular wireless communication standard being implemented by radio 460. The host interface 462 provides the recaptured inbound data 492 to the host device 318-332 via the radio interface 454.

As one of average skill in the art will appreciate, the wireless communication device of the embodiment 400 of FIG. 4 may be implemented using one or more integrated circuits. For example, the host device may be implemented on one integrated circuit, the digital receiver processing module 464, the digital transmitter processing module 476 and memory 475 may be implemented on a second integrated circuit, and the remaining components of the radio 460, less the antenna 486, may be implemented on a third integrated circuit. As an alternate example, the radio 460 may be implemented on a single integrated circuit. As yet another example, the processing module 450 of the host device and the digital receiver and transmitter processing modules 464 and 476 may be a common processing device implemented on a single integrated circuit. Further, the memory 452 and memory 475 may be implemented on a single integrated circuit and/or on the same integrated circuit as the common processing modules of processing module 450 and the digital receiver and transmitter processing module 464 and 476.

Any of the various embodiments of communication device that may be implemented within various communication systems can incorporate functionality to perform communication via more than one standard, protocol, or other predetermined means of communication. For example, a single communication device, designed in accordance with certain aspects of the invention, can include functionality to perform communication in accordance with a first protocol, a second protocol, and/or a third protocol, and so on. These various protocols may be WiMAX (Worldwide Interoperability for Microwave Access) protocol, a protocol that complies with a wireless local area network (WLAN/WiFi) (e.g., one of the IEEE (Institute of Electrical and Electronics Engineer) 802.11 protocols such as 802.11a, 802.11b, 802.11g, 802.11n, 802.11ac, etc.), a Bluetooth protocol, or any other predetermined means by which wireless communication may be effectuated.

Figure 5:
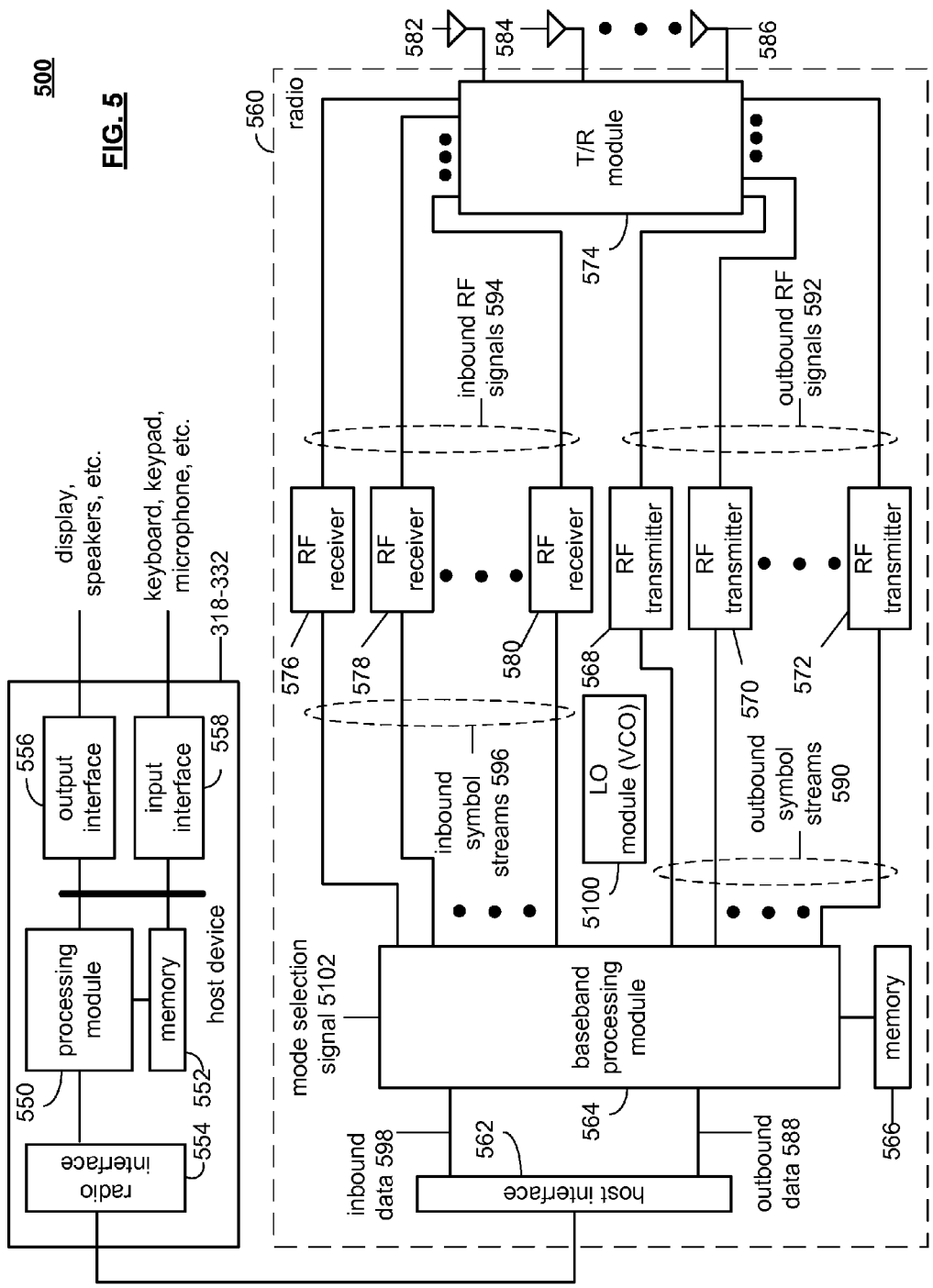
FIG. 5 is a diagram illustrating an alternative embodiment of a wireless communication device.

FIG. 5 is a diagram illustrating an alternative embodiment of a wireless communication device that includes the host device 318-332 and an associated at least one radio 560. For cellular telephone hosts, the radio 560 is a built-in component. For personal digital assistants hosts, laptop hosts, and/or personal computer hosts, the radio 560 may be built-in or an externally coupled component. For access points or base stations, the components are typically housed in a single structure.

As illustrated, the host device 318-332 includes a processing module 550, memory 552, radio interface 554, input interface 558 and output interface 556. The processing module 550 and memory 552 execute the corresponding instructions that are typically done by the host device. For example, for a cellular telephone host device, the processing module 550 performs the corresponding communication functions in accordance with a particular cellular telephone standard.

The radio interface 554 allows data to be received from and sent to the radio 560. For data received from the radio 560 (e.g., inbound data), the radio interface 554 provides the data to the processing module 550 for further processing and/or routing to the output interface 556. The output interface 556 provides connectivity to an output display device such as a display, monitor, speakers, et cetera such that the received data may be displayed. The radio interface 554 also provides data from the processing module 550 to the radio 560. The processing module 550 may receive the outbound data from an input device such as a keyboard, keypad, microphone, et cetera via the input interface 558 or generate the data itself. For data received via the input interface 558, the processing module 550 may perform a corresponding host function on the data and/or route it to the radio 560 via the radio interface 554.

Radio 560 includes a host interface 562, a baseband processing module 564, memory 566, a plurality of radio frequency (RF) transmitters 568-372, a transmit/receive (T/R) module 574, a plurality of antennae 582-386, a plurality of RF receivers 576-380, and a local oscillation module 5100 (which may be implemented, at least in part, using a VCO). The baseband processing module 564, in combination with operational instructions stored in memory 566, execute digital receiver functions and digital transmitter functions, respectively. The digital receiver functions, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, include, but are not limited to, scrambling, encoding, interleaving, constellation mapping, modulation, inverse fast Fourier transform, cyclic prefix addition, space and time encoding, and/or digital baseband to IF conversion. The baseband processing modules 564 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 566 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 564 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 560 receives outbound data 588 from the host device via the host interface 562. The baseband processing module 564 receives the outbound data 588 and, based on a mode selection signal 5102, produces one or more outbound symbol streams 590. The mode selection signal 5102 will indicate a particular mode as are illustrated in the mode selection tables, which appear at the end of the detailed discussion. Such operation as described herein is exemplary with respect to at least one possible embodiment, and it is of course noted that the various aspects and principles, and their equivalents, of the invention may be extended to other embodiments without departing from the scope and spirit of the invention.

For example, the mode selection signal 5102, with reference to table 1 [shown further below after the DETAILED DESCRIPTION OF THE INVENTION] may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), and data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 5102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 564, based on the mode selection signal 5102 produces the one or more outbound symbol streams 590 from the output data 588. For example, if the mode selection signal 5102 indicates that a single transmit antenna is being utilized for the particular mode that has been selected, the baseband processing module 564 will produce a single outbound symbol stream 590. Alternatively, if the mode select signal indicates 2, 3 or 4 antennae, the baseband processing module 564 will produce 2, 3 or 4 outbound symbol streams 590 corresponding to the number of antennae from the output data 588.

Depending on the number of outbound streams 590 produced by the baseband module 564, a corresponding number of the RF transmitters 568-372 will be enabled to convert the outbound symbol streams 590 into outbound RF signals 592. The transmit/receive module 574 receives the outbound RF signals 592 and provides each outbound RF signal to a corresponding antenna 582-386.

When the radio 560 is in the receive mode, the transmit/receive module 574 receives one or more inbound RF signals via the antennae 582-386. The T/R module 574 provides the inbound RF signals 594 to one or more RF receivers 576-380. The RF receiver 576-380 converts the inbound RF signals 594 into a corresponding number of inbound symbol streams 596. The number of inbound symbol streams 596 will correspond to the particular mode in which the data was received (recall that the mode may be any one of the modes illustrated in tables 1-12). The baseband processing module 560 receives the inbound symbol streams 590 and converts them into inbound data 598, which is provided to the host device 318-332 via the host interface 562.

In one embodiment of radio 560 it includes a transmitter and a receiver. The transmitter may include a MAC module, a PLCP module, and a PMD module. The Medium Access Control (MAC) module, which may be implemented with the processing module 564, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 564, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module includes an error protection module, a demultiplexing module, and a plurality of direction conversion modules. The error protection module, which may be implemented in the processing module 564, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

It is also noted that the wireless communication device of this diagram, as well as others described herein, may be implemented using one or more integrated circuits. For example, the host device may be implemented on one integrated circuit, the baseband processing module 564 and memory 566 may be implemented on a second integrated circuit, and the remaining components of the radio 560, less the antennae 582-586, may be implemented on a third integrated circuit. As an alternate example, the radio 560 may be implemented on a single integrated circuit. As yet another example, the processing module 550 of the host device and the baseband processing module 564 may be a common processing device implemented on a single integrated circuit. Further, the memory 552 and memory 566 may be implemented on a single integrated circuit and/or on the same integrated circuit as the common processing modules of processing module 550 and the baseband processing module 564.

The previous diagrams and their associated written description illustrate some possible embodiments by which a wireless communication device may be constructed and implemented. In some embodiments, more than one radio (e.g., such as multiple instantiations of the radio 460, the radio 560, a combination thereof, or even another implementation of a radio) is implemented within a wireless communication device. For example, a single wireless communication device can include multiple radios therein to effectuate simultaneous transmission of two or more signals. Also, multiple radios within a wireless communication device can effectuate simultaneous reception of two or more signals, or transmission of one or more signals at the same time as reception of one or more other signals (e.g., simultaneous transmission/reception).

Within the various diagrams and embodiments described and depicted herein, wireless communication devices may generally be referred to as WDEVs, DEVs, TXs, and/or RXs. It is noted that such wireless communication devices may be wireless stations (STAs), access points (APs), or any other type of wireless communication device without departing from the scope and spirit of the invention. Generally speaking, wireless communication devices that are APs may be referred to as transmitting or transmitter wireless communication devices, and wireless communication devices that are STAs may be referred to as receiving or receiver wireless communication devices in certain contexts.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications.

Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ah, ad, af, etc.).

A novel means of selectively performing inter-prediction or intra-prediction, or some combination thereof, in accordance with video encoding is presented herein. In certain embodiments, the selectivity of which type of prediction (e.g., inter-, intra-, or some combination thereof) is based particularly on a prediction or anticipation of one or more future values associated with actual bit and/or symbol rate of a communication channel It is noted here that the general terminology of physical rate of the communication channel is also employed herein; physical rate of the communication channel may be defined in terms of the actual amount of information that may be conveyed via the communication channel within a given period of time (e.g., and may be measured in terms of any number of ways including bits per second, symbols per second, etc.).

Generally speaking, such selectivity as presented herein between inter-prediction and intra-prediction in accordance with video encoding may be employed with any type of communication system. However, the oftentimes variability associated with wireless communication links/channels and wireless communication systems is at least one application context of particular interest. In some instances, actual measured values of the bit and/or symbol rate of a communication channel may be used to assist in the selection of performing inter-prediction or intra-prediction in accordance with video encoding That is to say, in one embodiment, the manner by which prediction is performed in accordance with video encoding is adjusted based upon an expected future actual bit and/or symbol rate (and/or an expected or predicted change thereof, a measured or detected change thereof, etc.) that a wireless communication channel may support. Generally speaking, with respect to various diagrams and/or embodiments herein, adjustment of the manner by which prediction is performed may be made based on any one or more of a number of conditions, such as an expected or predicted future value of a communication channel's actual bit and/or symbol rate, an expected or predicted future value of latency within encoder/transmitter and/or decoder/receiver components operating at opposite ends of the communication channel or link, etc. and/or any combination thereof. It is also noted that such functionality and operations may generally be applied to any of a number of types of communication channels (e.g., including many of those various types described with reference to FIG. 1). It is also noted that wireless communication channels may unfortunately have significantly greater variation and suffer from significantly more deleterious effects when compared to wired communication channels given the inherent wireless nature of such wireless communication channels.

Based upon a prediction or anticipation of a future value of the actual bit and/or symbol rate of a wireless communication channel (or a future change of the actual channel rate), the selectivity of performing video encoding in accordance with inter-prediction or intra-prediction, or some combination thereof, may be made. For example, there may be situations in which intra-prediction provides a video signal with acceptable quality, and there may be situations in which inter-prediction provides a video signal with acceptable quality. It is noted that intra-prediction may have certain advantages over inter-prediction, yet intra-prediction may operate in accordance with a requirement of a relatively higher bit rate than that which is required for inter-prediction. For example, intra-prediction, while perhaps requiring a relatively higher bit rate than inter-prediction, may provide certain advantages including relatively consistent bits/picture of the video signal, relatively low latency, and a high resiliency to errors.

In other instances, some blended combination of intra-prediction and inter-prediction provides a video signal with the acceptable quality. That is to say, selectivity between the respective video encoding operational modes of intra-prediction and inter-prediction may cooperatively provide a video signal with an acceptable quality. Moreover, it is noted that when operating in accordance with inter-prediction, there may be instances in which at least some information associated with a given frame or picture is employed as part of the overall compression scheme. That is to say, video encoding operating in accordance with inter-prediction may sometimes use at least some intra-prediction as part of the overall compression scheme as well.

Also, such selectivity between intra-prediction and inter-prediction operational modes may be made based upon the latency of the video stream being provided from a first device to a second device via a communication channel. For example, the selectivity between intra-prediction and inter-prediction in accordance with video encoding may be made based upon latency considerations associated with a communication channel. As the physical rate of a communication channel lessens, there may be more associated buffer delay in a device operative to perform video encoding. That is to say, as the physical rate decreases, there may be more buffer delay within such a device performing transmission of an encoded video signal into a communication channel, in that, the physical rate of the communication channel will not be able to support a sufficiently high rate at a given time. Again, such variability in variation of the physical rate that may be supported by communication channel may be more exacerbated within certain applications, such as those employing one or more wireless communication links.

Figure 6:
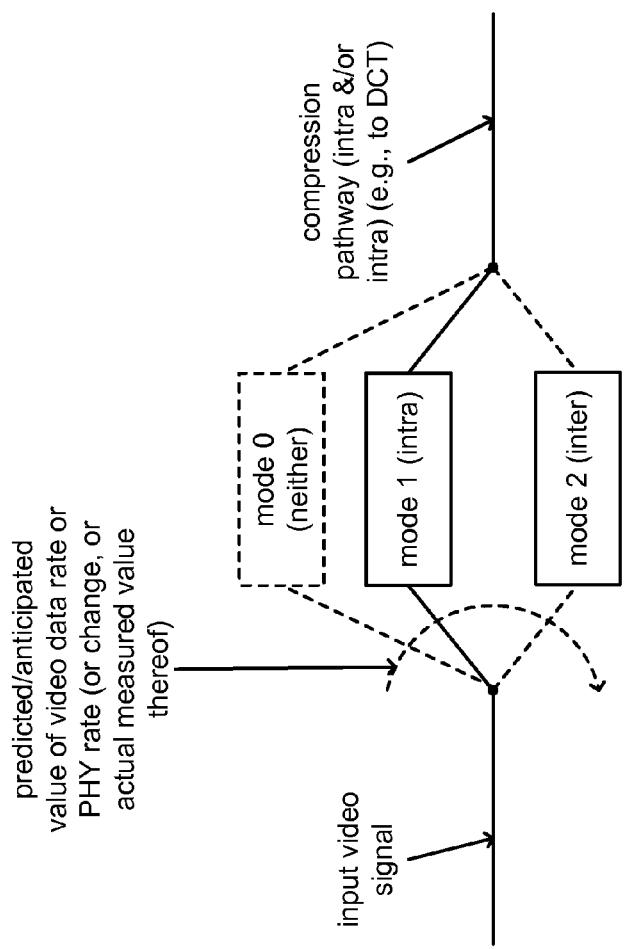
FIG. 6 is a diagram illustrating an embodiment of selective intra and/or inter-prediction processing in accordance with predicted and/or anticipated value (and/or change) of a PHY rate of a communication channel.

FIG. 6 is a diagram illustrating an embodiment 600 of selective intra and/or inter-prediction processing in accordance with predicted and/or anticipated value (or change thereof) of a PHY rate of a communication channel. As may be seen with respect to this diagram, an input video signal selectively undergoes intra-prediction or inter-prediction in accordance with video encoding based upon a predicted or anticipated future value of the physical rate of a communication channel. Also, in other embodiments, it is noted that actual measurements of the physical rate of the communication channel may be used to direct the selectivity between intra-prediction or inter-prediction in accordance with video encoding. Moreover, in even other instances or embodiments, a predicted or anticipated future physical rate of the communication channel may drive this selectivity. The input video signal may undergo intra-prediction in accordance with video encoding, inter-prediction in accordance with video encoding, or some combination thereof. From the selective prediction encoding operations, a modified video signal is output via a compression pathway. In certain embodiments as described with respect to other diagrams herein, the compression pathway leads to a transform module, circuitry, etc. In some instances, such transformation is performed in accordance with a discrete cosine transform (DCT).

Generally speaking, selectivity between at least two operational modes is made based upon a predicted or anticipated physical rate (and/or change thereof) of a communication channel. Particularly in the context of a wireless communication channel, there may sometimes be significant change in the physical rate that may be supported thereby. For example, a wireless communication channel may unfortunately be affected from interference, noise, and or other deleterious effects, etc., and the physical rate that may be supported within such a wireless communication channel may vary accordingly. For example, at certain times, a relatively high physical rate may be supported, while at other times, relatively lower physical rate may be supported. In accordance with various embodiments presented herein, such physical rate considerations are operative to drive the selection which video encoding mode is to be employed at any given time.

In certain embodiments, it is noted that neither intra-prediction nor inter-prediction is performed in accordance with video encoding of an input video signal. That is to say, in such an embodiment, the compression pathway operates with no selectivity between intra-prediction or inter-prediction. In such an instance, the input video signal undergoes neither form of prediction in accordance with video encoding, and it is the input video signal itself which undergoes compression along the compression pathway.

Generally speaking, as can be seen with respect to the embodiment 600 associated with FIG. 6, different parameters may be used to drive the selection between intra-prediction and inter-prediction in accordance with video encoding. Again, in certain instances, neither intra-prediction nor inter-prediction may be employed. Selectivity between these various operational modes may be made in accordance with a variety of different video encoding architectures. The following diagrams describe some possible architectures that may employ such selectivity between various operational modes. It is noted also that such selectivity between such operational modes may be generally applied to any video encoding architecture implemented to perform at least intra-prediction and inter-prediction. That is to say, any video encoding architecture operative to perform at least these two operational modes, intra-prediction and inter prediction, may be adapted to effectuate such selectivity in accordance with various aspects, and their equivalents, of the invention. It is again noted that certain of the following diagrams that describe various architectures for video encoding are exemplary, and alternative architectures may also be employed without departing from the scope and spirit of the invention.

Figure 7:
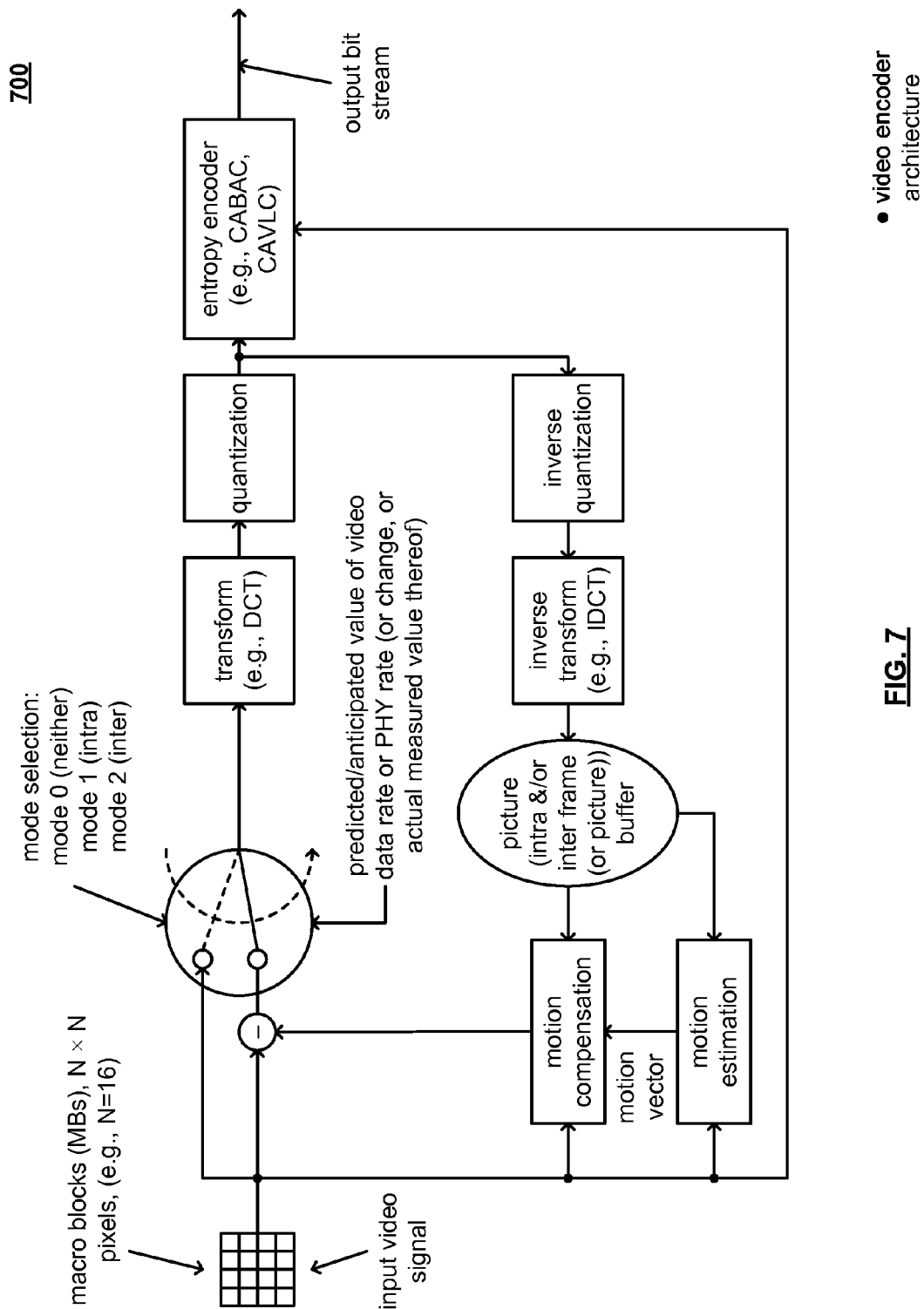
FIG. 7 and FIG. 8 are diagrams illustrating various embodiments of selective intra and/or inter-prediction processing, as included within respective video encoding architectures, in accordance with predicted and/or anticipated value (and/or change) of a PHY rate of a communication channel.
Figure 8:
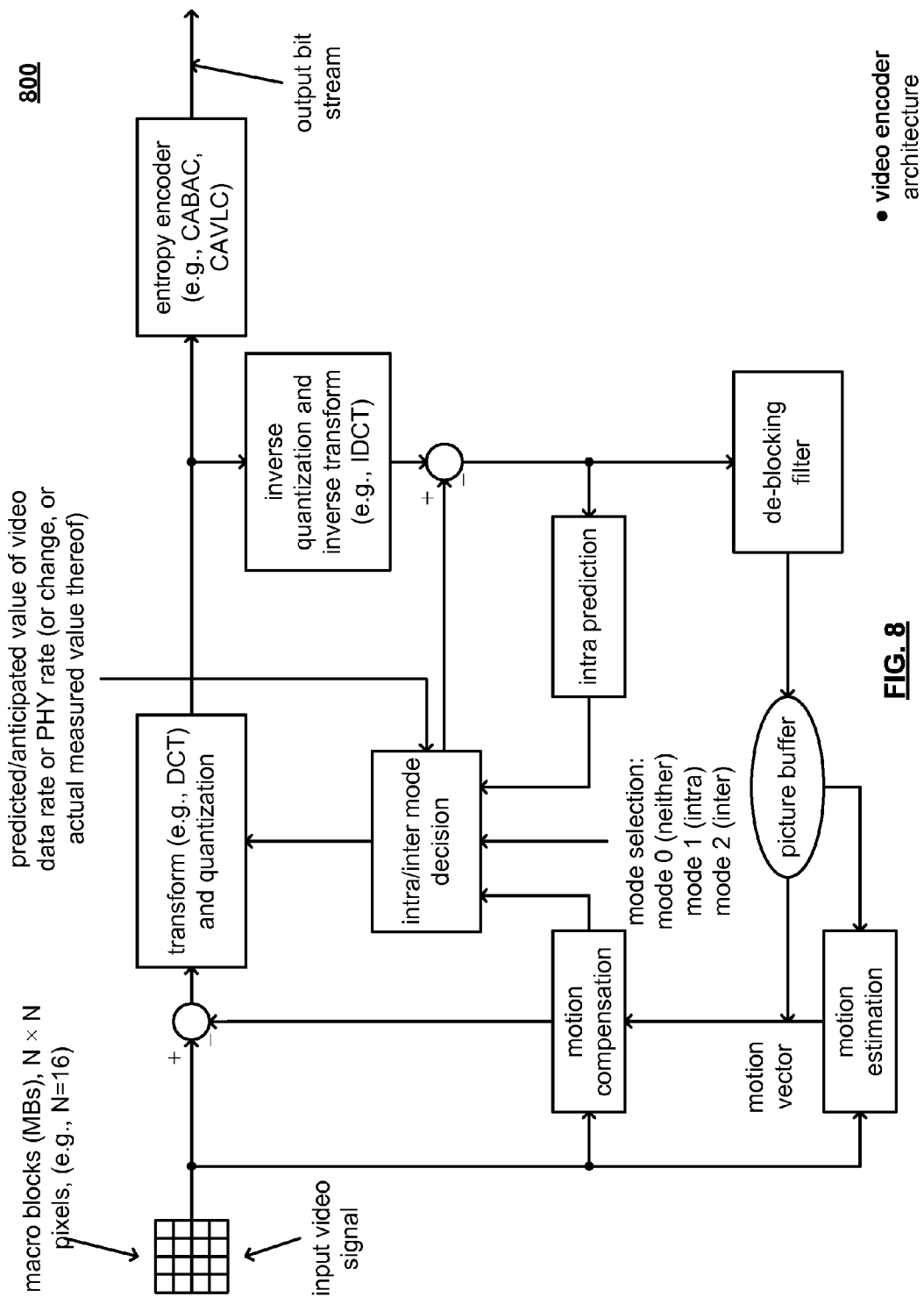

FIG. 7 and FIG. 8 are diagrams illustrating various embodiments 700 and 800, respectively, of selective intra and/or inter-prediction processing, as included within respective video encoding architectures, in accordance with predicted and/or anticipated value (or change thereof) of a PHY rate of a communication channel.

Referring to embodiment 700 of FIG. 7, as may be seen with respect to this diagram, an input video signal is received by a video encoder. In certain embodiments, the input video signal is composed of macro-blocks. The size of such macro-blocks may be varied, and can include a number of pixels typically arranged in a square shape. In one embodiment, such macro-blocks have a size of 16×16 pixels. However, it is generally noted that a macro-block may have any desired size such as N×N pixels, where N is an integer. Of course, some implementations may include non-square shaped macro-blocks, although square shaped macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. A prediction or anticipation of a future value of the actual or physical rate that may be supported by a communication channel is used to adapt the selection of which mode of video encoding is to be performed (e.g., inter-prediction, intra-prediction, or neither intra-prediction nor inter-prediction). In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2,−3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

A picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

In a preferred embodiment, selectivity of an operational mode (e.g., inter-prediction, intra-prediction, or neither inter-prediction nor intra-prediction) in accordance with video encoding to generate an output bit stream provided via a compression pathway is based upon a prediction of a future or expected value (or change thereof) of the physical rate of a communication channel. In the context of wireless communication systems, an anticipation or expectation of a future value (or change thereof) of the physical rate of the actual wireless communication channel is used to drive the decision-making of which operational mode is to be performed in accordance with video encoding. In some instances, the prediction of a future or expected value (or change thereof) of the physical rate of the wireless communication channel is one of multiple decision making considerations that determine which operational mode is to be performed in accordance with video encoding. That is to say, in such an embodiment, the prediction of a future or expected value (or change thereof) of the physical rate of the wireless communication channel is but one of multiple considerations that drive operational mode selection. In other embodiments, the prediction of a future or expected value (or change thereof) of the physical rate of the wireless communication channel is the sole consideration that drives operational mode selection. Of course, various alternative embodiments may more heavily or more lightly weight physical rate considerations in selecting the operational mode by which video encoding should be performed.

Referring to embodiment 800 of FIG. 8, with respect to this diagram depicting an alternative embodiment of a video encoder, such a video encoder carries out prediction, transform, and encoding processes to produce a compressed bit stream. Such a video encoder may operate in accordance with and be compliant with one or more video encoding protocols, standards, and/or recommended practices such as ISO/IEC 14496-10—MPEG-4 Part 10, AVC (Advanced Video Coding), alternatively referred to as H.264/MPEG-4 Part 10 or AVC (Advanced Video Coding), ITU H.264/MPEG4-AVC.

It is noted that a corresponding video decoder, such as located within a device at another end of a communication channel, is operative to perform the complementary processes of decoding, inverse transform, and reconstruction to produce a respective decoded video sequence that is (ideally) representative of the input video signal.

As may be seen with respect to this diagram, alternative arrangements and architectures may be employed for effectuating video encoding. Generally speaking, an encoder processes an input video signal (e.g., typically composed in units of macro-blocks, often times being square in shape and including N×N pixels therein). The video encoding determines a prediction of the current macro-block based on previously coded data. That previously coded data may come from the current frame (or picture) itself (e.g., such as in accordance with intra-prediction) or from one or more other frames (or pictures) that have already been coded (e.g., such as in accordance with inter-prediction). The video encoder subtracts the prediction of the current macro-block to form a residual.

Generally speaking, intra-prediction is operative to employ block sizes of one or more particular sizes (e.g., 16×16, 8×8, or 4×4) to predict a current macro-block from surrounding, previously coded pixels within the same frame (or picture). Generally speaking, inter-prediction is operative to employ a range of block sizes (e.g., 16×16 down to 4×4) to predict pixels in the current frame (or picture) from regions that are selected from within one or more previously coded frames (or pictures).

With respect to the transform and quantization operations, a block of residual samples may undergo transformation using a particular transform (e.g., 4×4 or 8×8). One possible embodiment of such a transform operates in accordance with discrete cosine transform (DCT). The transform operation outputs a group of coefficients such that each respective coefficient corresponds to a respective weighting value of one or more basis functions associated with a transform. After undergoing transformation, a block of transform coefficients is quantized (e.g., each respective coefficient may be divided by an integer value and any associated remainder may be discarded, or they may be multiplied by an integer value). The quantization process is generally inherently lossy, and it can reduce the precision of the transform coefficients according to a quantization parameter (QP). Typically, many of the coefficients associated with a given macro-block are zero, and only some nonzero coefficients remain. Generally, a relatively high QP setting is operative to result in a greater proportion of zero-valued coefficients and smaller magnitudes of non-zero coefficients, resulting in relatively high compression (e.g., relatively lower coded bit rate) at the expense of relatively poorly decoded image quality; a relatively low QP setting is operative to allow more nonzero coefficients to remain after quantization and larger magnitudes of non-zero coefficients, resulting in relatively lower compression (e.g., relatively higher coded bit rate) with relatively better decoded image quality.

The video encoding process produces a number of values that are encoded to form the compressed bit stream. Examples of such values include the quantized transform coefficients, information to be employed by a decoder to re-create the appropriate prediction, information regarding the structure of the compressed data and compression tools employed during encoding, information regarding a complete video sequence, etc. Such values and/or parameters (e.g., syntax elements) may undergo encoding within an entropy encoder operating in accordance with CABAC, CAVLC, or some other entropy coding scheme, to produce an output bit stream that may be stored, transmitted (e.g., after undergoing appropriate processing to generate a continuous time signal that comports with a communication channel), etc.

In an embodiment operating using a feedback path, the output of the transform and quantization undergoes inverse quantization and inverse transform. One or both of intra-prediction and inter-prediction may be performed in accordance with video encoding. As also described with respect to other embodiments, motion compensation and/or motion estimation may be performed in accordance with such video encoding.

In a preferred embodiment, the mode selection by which an input video signal is processed is based, at least in part, upon a prediction of a future or expected value (or change thereof) of the physical rate of the communication channel or upon a prediction of the future are expected data rate available for transmission of video data across the communication channel (e.g., which may include latency considerations). With reference to FIG. 8, such consideration of future or expected value (or change thereof) of characteristics associated with the communication channel may be employed to drive the inter/inter mode decision. As can also be seen with respect to the diagram, consideration regarding which operational mode of video encoding is to be performed at or during a given time is based, at least in part, upon prediction of a future or expected value (or change thereof) of the physical rate of the communication channel.

Figure 9:
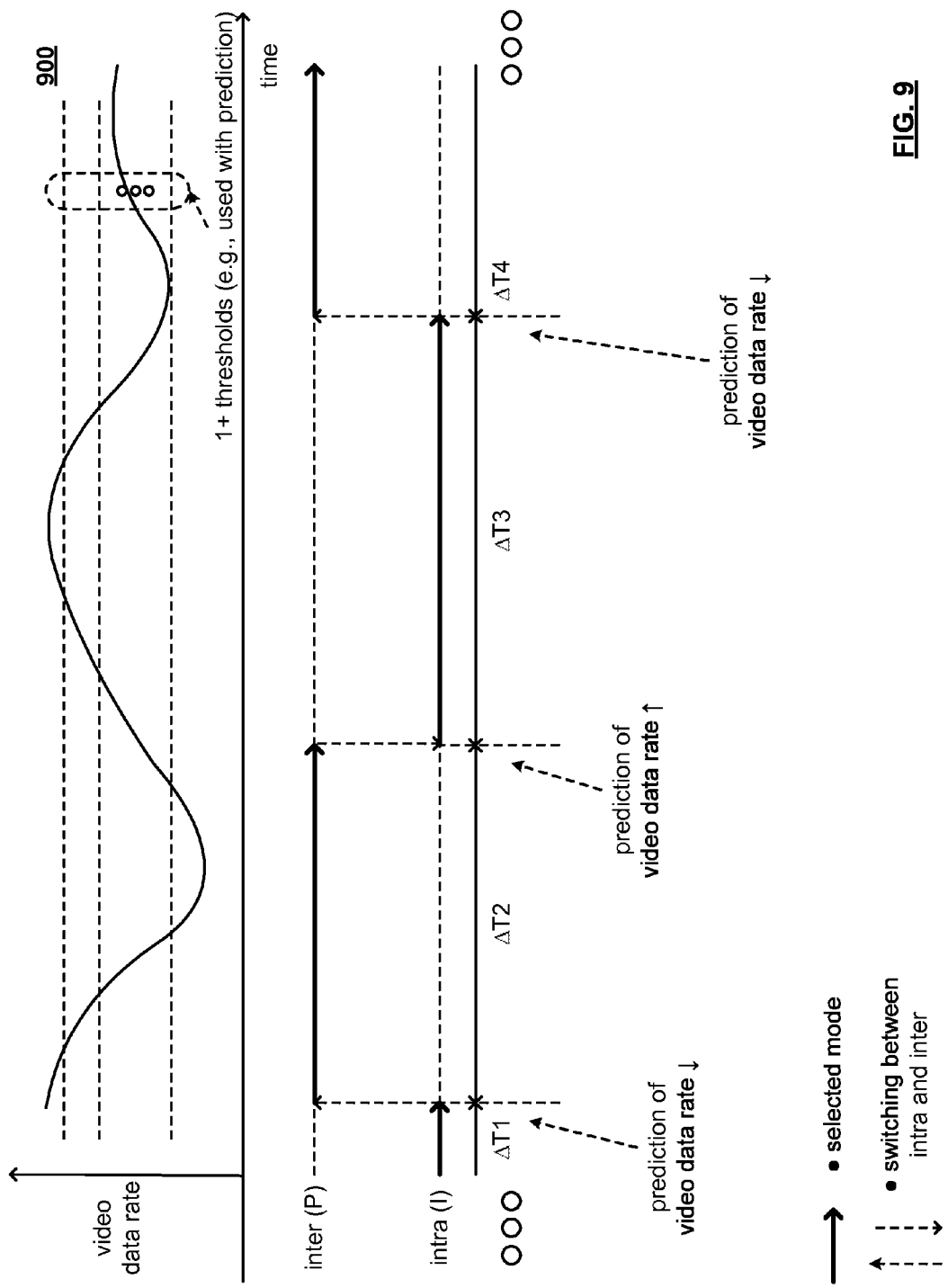
FIG. 9 is a diagram illustrating an embodiment of adaptation of intra and/or inter-prediction processing over time and based on variation of video data rate of a communication channel.

FIG. 9 is a diagram illustrating an embodiment 900 of adaptation of intra and/or inter-prediction processing over time and based on variation of video data rate of a communication channel. As may be seen with respect to this diagram, the actual channel rate or physical rate (e.g., the video data rate) of a communication channel may vary over time, and consequently the video data rate that may be supported across that communication channel will also vary. Particularly in the context of a wireless communication channel, such variation may be more pronounced than in a wired communication channel, with associated variation of the rate by which information may be communicated through such a communication channel. While the various principles and functionality presented herein may generally be adapted to video signaling to be transmitted via any type of communication channel (e.g., including any of those described with reference to FIG. I), the potential variability of wireless communication channels may be one application context of particular interest and significance.

Depending upon a prediction of the channel rate or physical rate of the communication channel, which rate may be increasing or decreasing, selectivity between intra-prediction and inter-prediction is performed in accordance with video encoding. It is noted that such prediction of a future or expected value (or change thereof) of the channel rate or physical rate of a communication channel need not be based merely upon the detection of an increase or decrease of such operational parameters (such as video data rate), but may instead be a forward-looking anticipation of an expected future value (or change thereof) of the channel rate or physical rate of the communication channel. In response to this prediction of a future or expected value (or change thereof) of any such operational parameters, selectivity between intra-prediction and inter-prediction is performed in accordance with video encoding. Generally speaking, such a video encoder may be implemented to consider future or expected values (or changes thereof) of the video data rate that may be supported by communication channel.

It is also noted that the video encoder may be implemented to respond to changes of the video data rate, in that, selectivity between intra-prediction and inter-prediction may be made based upon actual detected or measured values (or changes thereof) of the video data rate that a given communication channel actually supports. For example, based upon an actual measured or detected degradation of video data rate, the video encoding may switch to the inter-prediction operational mode. Then, based upon an actual measured or detected improvement or increase of video data rate, the video encoding may switch to the intra-prediction operational mode.

It is generally noted that prediction of future values (or changes thereof) of the video data rate of a communication channel and/or actual measured values (or changes thereof) of the video data rate actually being supported by communication channel are exemplary operational parameters that may be used to drive the selectivity between intra-prediction and inter-prediction in accordance with video encoding.

While certain embodiments operate by making the selectivity between intra-prediction and inter-prediction based upon actual measured or detected values associated with the video data rate of the communication channel, in certain other embodiments, selectivity between intra-prediction and inter-prediction is performed before such changes of channel rate or physical rate of the communication channel actually takes place (e.g., based upon a predicted or expected future value of the channel rate or physical rate (e.g., video data rate) of the communication channel). For example, one or more thresholds may be employed to assist in the selectivity between intra-prediction and inter-prediction.

One possible embodiment would employ two respective thresholds (e.g., thereby providing a certain degree of hysteresis). As the video data rate actually falls or is expected to fall below a first threshold, the video encoding could switch to inter-prediction. Then, if the video data rate actually rises or is expected to rise above a second threshold (e.g., the second threshold being greater than the first threshold), then the video encoding could switch to intra-prediction. Generally speaking, one or more different thresholds may be employed to assist in driving the selection between intra-prediction and inter-prediction.

In addition, by employing multiple thresholds, and by tracking the channel rate or physical rate of the communication channel across those one or more thresholds, a prediction of a future or expected value of the channel rate or physical rate (e.g., video data rate) may be made. For example, by having additional granularity as provided by more than one threshold, improved decision-making may be achieved with respect to a predicted future or expected value of the channel rate or physical rate (e.g., video data rate) of the communication channel In addition, as also mentioned with respect to other embodiments, certain implementations may also operate in making selections between intra-prediction and inter-prediction as a function of an actual measured or detected value (or change a value) of channel rate, physical rate, and/or available video data rate of the communication channel.

That is to say, while selectivity may be made based upon a predicted or expected future value of the channel rate or physical rate (e.g., video data rate) of the communication channel, such selectivity may also or alternatively be made based upon actual measured or detected values of the channel rate or physical rate (e.g., the video data rate) of the communication channel Moreover, in even other embodiments, selectivity between intra-prediction and inter-prediction may be made as a function of a combination of actual measurements and predicted or expected future values associated with the physical rate of the communication channel If desired, either the actual or the predicted values may be given relatively more consideration. For example, a predicted value may be weighted more than an actual measured value in one embodiment, while an actual measured value may be weighted more than a predicted value in another embodiment. Decision-making employed to effectuate the selectivity between intra-prediction and inter-protection may be made in consideration of both actual and predicted values associated with the channel rate, physical rate, and/or available video data rate of the communication channel.

If the channel rate, physical rate, and/or available video data rate of the communication channel actually falls or is expected to fall below such a threshold (such as a first threshold in a two threshold embodiment), then the video encoding may operate in accordance with inter-prediction. If the channel rate, physical rate, and/or available video data rate of the communication channel actually rises or is expected to rise above another threshold (such as a second threshold in a two threshold embodiment), then the video encoding may operate in accordance with intra-prediction. Switching between these respective prediction modes in accordance with video encoding may be driven, at least in part, on actual or detected values associated with the channel rate or physical rate (e.g., video data rate) of the communication channel and/or prediction of future or expected values associated with the channel rate or physical rate (e.g., video data rate). Again, such considerations may be based upon the channel rate or physical rate (e.g., video data rate) actually rising above or falling below (or expected to rise above or fall below) one or more particular thresholds.

In certain embodiments, the one or more thresholds employed for such decision-making are fixed or predetermined. In alternative embodiments, any one or more of such thresholds may be adaptively determined or modified as a function of one or more considerations. Such considerations may include environmental variations, interference, noise, processing history, error rates, relative importance of latency in comparison to video quality, characteristics of the video being encoded, and/or any other consideration, etc.

It is again noted that when the inter-prediction operational mode is selected, some frames (or pictures), or portions of some frames (or pictures), may undergo processing in accordance with intra-prediction. That is to say, the inter-prediction operational mode may have at least some processing therein performed in accordance with intra-prediction.

Figure 10:
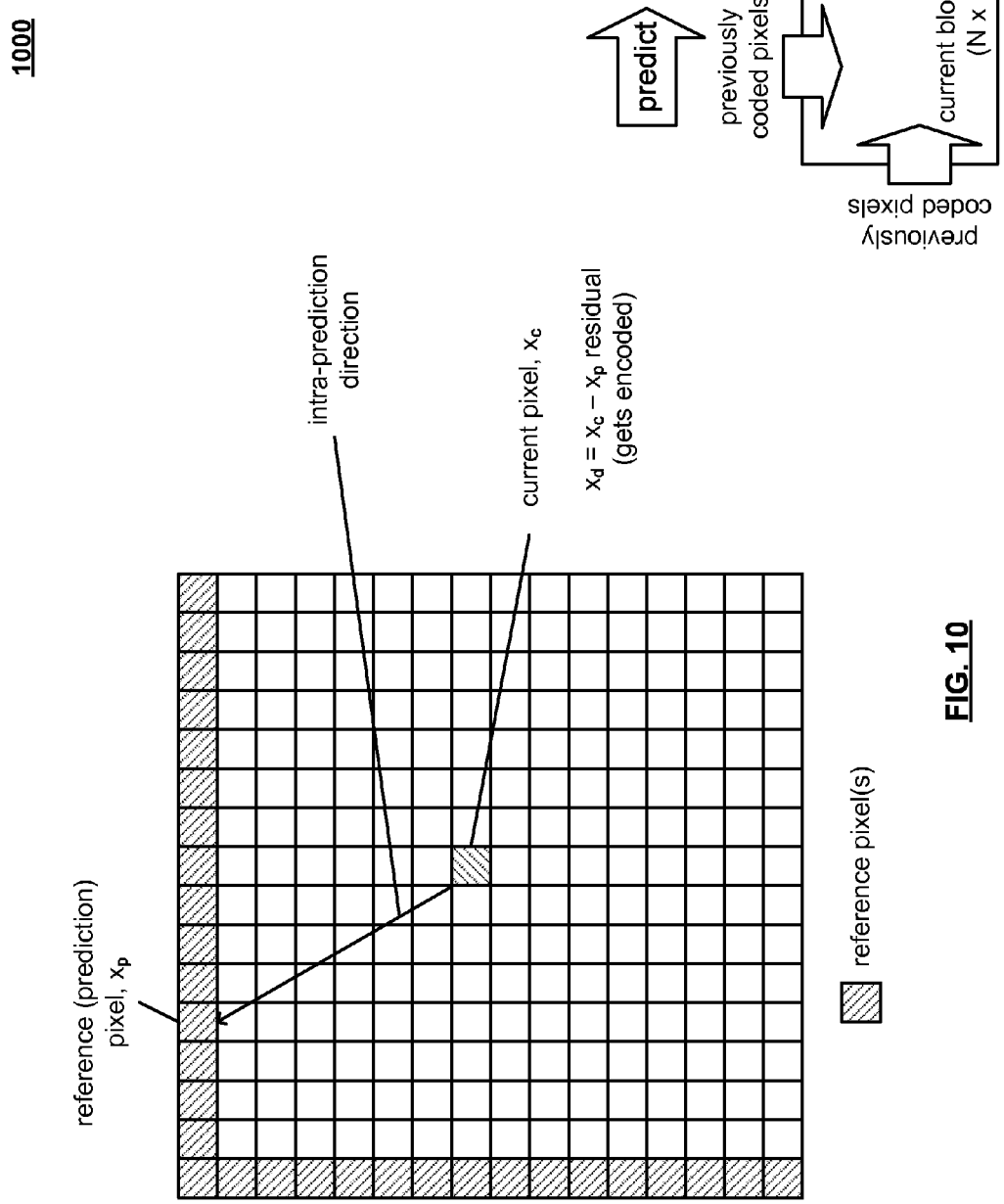
FIG. 10 is a diagram illustrating an embodiment of intra-prediction processing.

FIG. 10 is a diagram illustrating an embodiment 1000 of intra-prediction processing. As can be seen with respect to this diagram, a current block of video data (e.g., often times being square in shape and including generally N×N pixels) undergoes processing to estimate the respective pixels therein. Previously coded pixels located above and to the left of the current block are employed in accordance with such intra-prediction. From certain perspectives, an intra-prediction direction may be viewed as corresponding to a vector extending from a current pixel to a reference pixel located above or to the left of the current pixel. Details of intra-prediction as applied to coding in accordance with H.264/AVC are specified within the corresponding standard (e.g., International Telecommunication Union, ITU-T, TELECOMMUNICATION STANDARDIZATION SECTOR OF ITU, H.264 (03/2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264) that is incorporated by reference above.

The residual, which is the difference between the current pixel and the reference or prediction pixel, is that which gets encoded. As can be seen with respect to this diagram, intra-prediction operates using pixels within a common frame (or picture). It is of course noted that a given pixel may have different respective components associated therewith, and there may be different respective sets of samples for each respective component.

Figure 11:
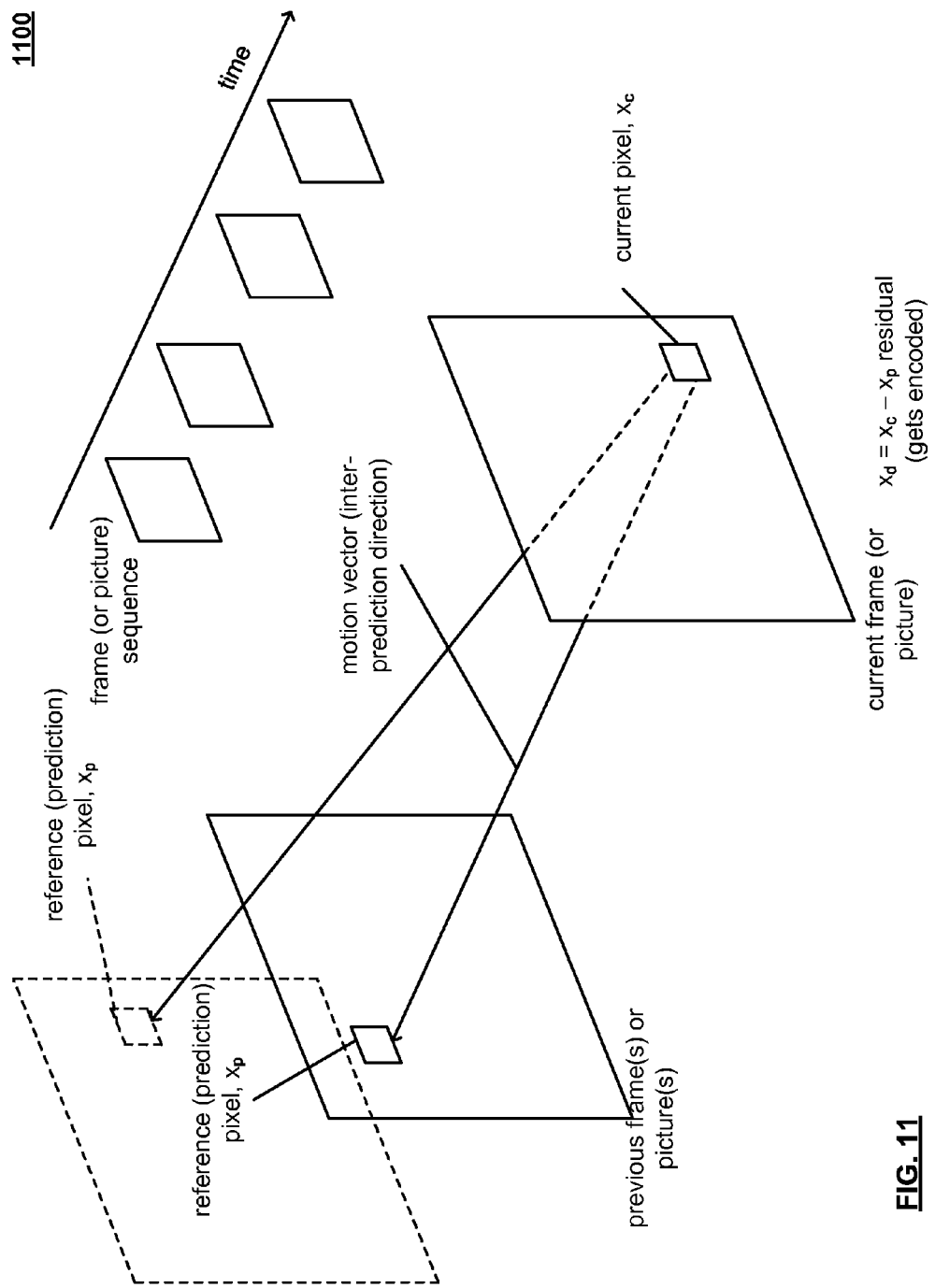
FIG. 11 is a diagram illustrating an embodiment of inter-prediction processing.

FIG. 11 is a diagram illustrating an embodiment 1100 of inter-prediction processing. In contradistinction to intra-prediction, inter-prediction is operative to identify a motion vector (e.g., an inter-prediction direction) based on a current set of pixels within a current frame (or picture) and one or more sets of reference or prediction pixels located within one or more other frames (or pictures) within a frame (or picture) sequence. As can be seen, the motion vector extends from the current frame (or picture) to another frame (or picture) within the frame (or picture) sequence. Inter-prediction may utilize sub-pixel interpolation, such that a prediction pixel value corresponds to a function of a plurality of pixels in a reference frame or picture.

A residual may be calculated in accordance with inter-prediction processing, though such a residual is different from the residual calculated in accordance with intra-prediction processing. In accordance with inter-prediction processing, the residual at each pixel again corresponds to the difference between a current pixel and a predicted pixel value. However, in accordance with inter-prediction processing, the current pixel and the reference or prediction pixel are not located within the same frame (or picture).

Figure 12:
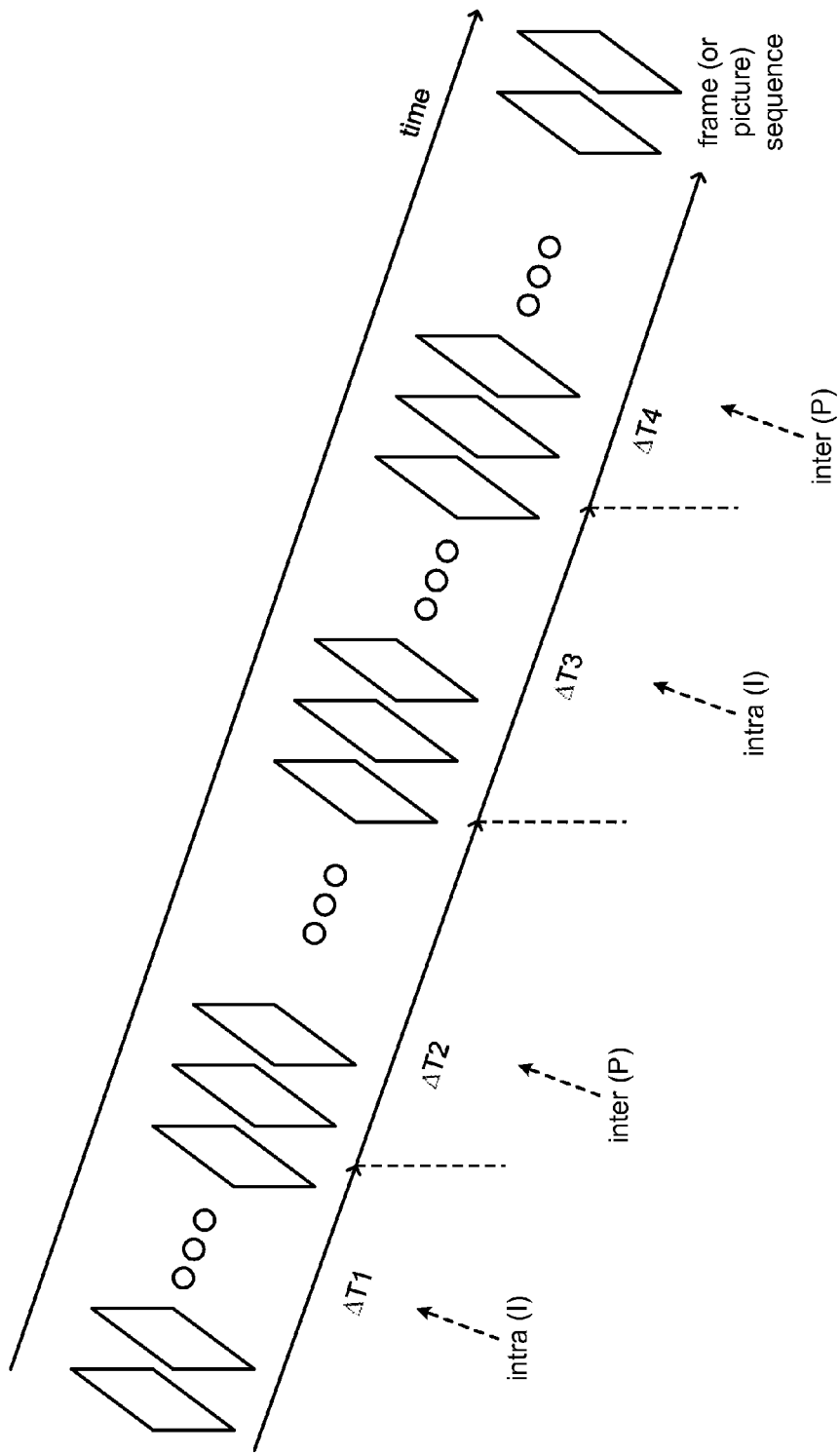
FIG. 12 is a diagram illustrating an embodiment of selective intra and/or inter-prediction processing of a sequence of frames or pictures corresponding to a video signal.

FIG. 12 is a diagram illustrating an embodiment 1200 of selective intra and/or inter-prediction processing of a sequence of frames or pictures corresponding to a video signal. As can be seen with respect to this diagram, when considering a frame (or picture) sequence over time in which a number of frames (or pictures) may be viewed as part of a successive stream of frames (or pictures), selectivity between intra-prediction and inter-prediction may be made over time.

As can also be seen with respect to this diagram, multiple frames (or pictures) may be encoded in accordance with one operational mode of video encoding, while subsequent multiple other frames (or pictures) may be encoded within another operational mode of video encoding. The switching between such operational modes of video encoding may be driven by, for example, changes in the available video data rate of the communication channel.

The selectivity between inter-prediction and intra-prediction in accordance with video encoding will typically not be as often as on a frame by frame basis (or picture by picture basis), but such selectivity will typically be made in a manner that switching back and forth is made after processing several frames (or pictures) in accordance with a first operational mode, then subsequent several frames (or pictures) in accordance with a second operational mode, and so on. Again, generally speaking, the switching between the respective operational modes is not made very frequently, but operation is performed in accordance with one of the operational modes over a number of frames (or pictures) of the video signal, then operation is performed in accordance with the other of the operational modes over a subsequent number of frames (or pictures) of the video signal, and so on. Switching of operational modes may, however, be performed at any picture, without necessarily utilizing one operational mode for a plurality of successive frames or pictures before each selection of operational mode.

For example, a first plurality of frames (or pictures) may undergo video encoding in accordance with intra-prediction. Then, a second plurality of frames (or pictures) (e.g., successive to and following the first plurality of frames (or pictures)) may undergo video encoding in accordance with inter-prediction. This selectivity between the various operational modes may be made multiple times, and each respective operational mode may operate on different respective numbers of frames (or pictures). That is to say, the first plurality of frames (or pictures) and the second plurality of frames (or pictures) may include respectively different numbers of frames (or pictures).

Also, this switching between the different operational modes of video encoding, namely, intra-prediction and inter-prediction may be made based upon the available video data rate of the communication channel. For example, as the video data rate degrades (e.g., which may result in increased buffer delay), the operational mode may be switched from intra-prediction to inter-prediction. Then, if the video data rate improves (e.g., which may result in decreased buffer delay), then the operational mode may be switched back to intra-prediction.

As may be understood with respect to in accordance with various aspects, and their equivalents, of the invention, switching between intra-prediction and inter-prediction, as may be performed in accordance with video encoding, may be performed adaptively as a function of bandwidth capacity, channel rate, bit rate and/or symbol rate, video data rate, etc. of a communication channel. For example, based on a predicted future or expected value (or change thereof) of any of such characteristics or parameters of a communication channel (e.g., bandwidth capacity, channel rate, bit rate and/or symbol rate, video data rate, etc.), either intra-prediction and inter-prediction may be selectively employed for video encoding.

FIG. 13A, FIG. 13B, FIG. 14A, FIG. 14B, FIG. 15A, FIG. 15B, and FIG. 16 illustrate various embodiments of methods as may be performed in accordance with operation of various devices such as various wireless communication devices operative to perform encoding of media signals and/or transmission within wireless communication systems and/or networks. In these diagrams, the various methods are indicated as starting in a start box (pictorially identified with "S"), and ending in an end box (pictorially identified with "E"). When a method has more than one possible end, the respective ends are identified as E1, E2, etc.

Figure 13B:
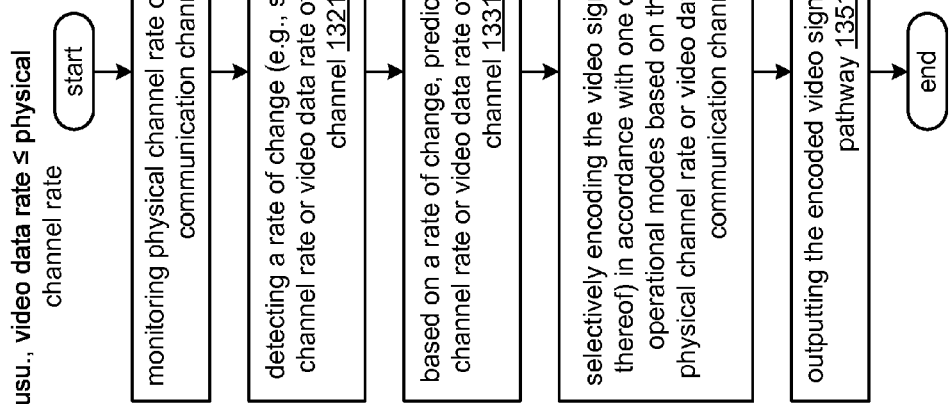
Figure 13A:
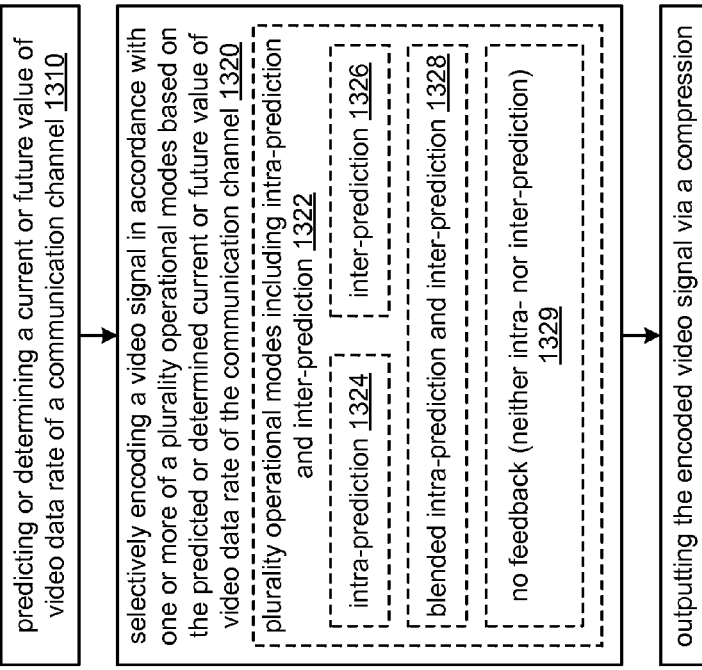

Referring to method 1300 of FIG. 13A, the method 1300 begins by predicting or determining a current or future value of video data rate of a communication channel, as shown in a block 1310. That is to say, as described elsewhere herein with respect other embodiments, actual measured values of video data rate of the communication channel, predictions of future values of video data rate of the communication channel, and/or combinations thereof may be employed in accordance with selectively encoding a video signal in accordance with different operational modes. For example, one implementation may operate in accordance with actual measured values of the video data rate of the communication channel. Another implementation may operate in accordance with predicting future values of the video data rate indication channel. Generally speaking, such selection between different encoding operational modes may be made based on a predicted future value of the video data rate, based on an actual measured value of the video data rate, etc.

As the reader will understand, while some embodiments operate based upon actual measured values of the video data rate of the communication channel, prediction of a future or expected value of a physical channel rate of the communication channel (e.g., video data rate) may also or alternatively be employed. Prediction of a future value of the video data rate is an attempt to determine what the video data rate of the communication channel will be sometime in the future. In a perfect world, such predictions would always be 100% accurate, but, as the reader will understand, such prediction cannot be made with 100% certainty all of the time. Various operations as described herein including within various respective methods herein relate to performing adaptation and/or selective operation based upon actual measured values of the video data rate of the communication channel, prediction of future or expected values of the video data rate of the communication channel, etc. Generally speaking, such adaptation and/or selective operation may be performed presently either based on actual measured values of the video data rate or in anticipation of an expected future value of the video data rate of the communication channel. With respect to the video data rate of the communication channel, it is noted that such a rate may correspond to the actual physical (PHY) layer of the communication channel (e.g., in an instance when the entirety of the available channel is employed for transmission of a video signal). However, there may be instances in which more than one video signal or other signals are transmitted over a given communication channel (e.g., in which case, the respective video data rates of the multiple video signals will consequently be less than the actual physical rate that may be supported by the communication channel).

In certain situations, the actual physical rate of communication channel corresponds to the raw bit rate and/or raw bit error rate (or alternatively, the raw symbol rate and/or raw symbol error rate, etc.) that may be effectuated via the communication channel; this may be viewed as being a maximum throughput that the communication channel can support at a given time.

The method 1300 continues by selectively encoding a video signal in accordance with any one or more of a number of operational modes based upon the predicted or determined current or future value of video data rate of the communication channel, as shown in a block 1320.

In some embodiments, certain of the plurality of operational modes include intra-prediction and/or inter-prediction, as shown in blocks 1324 and 1326. In certain other embodiments, the plurality of operational modes may alternatively or also include some blended form of intra-prediction and inter-prediction, as shown in a block 1328. For example, some particular type of combination of intra-prediction and inter-prediction processing (e.g., in which some corresponding amount of intra-prediction and some corresponding amount of inter-prediction is performed) may be performed in a given, desired mode of operation.

In even other embodiments, at least one of the plurality of operational modes may include or correspond to operating in accordance with no feedback (e.g., such as operating in accordance with neither intra-prediction nor inter-prediction in which the video signal itself is that which is provided via a compression pathway), as shown in a block 1329. The method 1300 then operates by outputting the encoded video signal via a compression pathway, as shown in a block 1330.

Referring to method 1301 of FIG. 13B, the method 1301 begins by monitoring a physical channel rate or video data rate of the communication channel, as shown in a block 1311. The method 1301 then operates by detecting a rate of change (e.g., a slope) of the physical channel rate or video data rate of the communication channel, as shown in a block 1321. For example, by monitoring the physical channel rate or video data rate of the communication channel over a period of time, and particularly taking such measurements at different respective periods of time, a rate of change of the physical channel rate or video data rate of the communication channel may be made based upon any two or more such measurements.

The method 1301 continues by predicting a future physical channel rate or video data rate of the communication channel based on the rate of change, as shown in a block 1331. That is to say, based upon a number of considerations such as rates of change, slopes, rates of degradation, rates of improvement, etc., the method 1301 is operative to make prediction of the future physical channel rate or video data rate of the communication channel.

The method 1301 then operates by selectively encoding a video signal in accordance with one or more of a plurality of operational modes based on the predicted future physical channel rate or video data rate of the communication channel, as shown in a block 1341. The method 1301 continues by outputting the encoded video signal via a compression pathway, as shown in a block 1351.

Figure 14B:
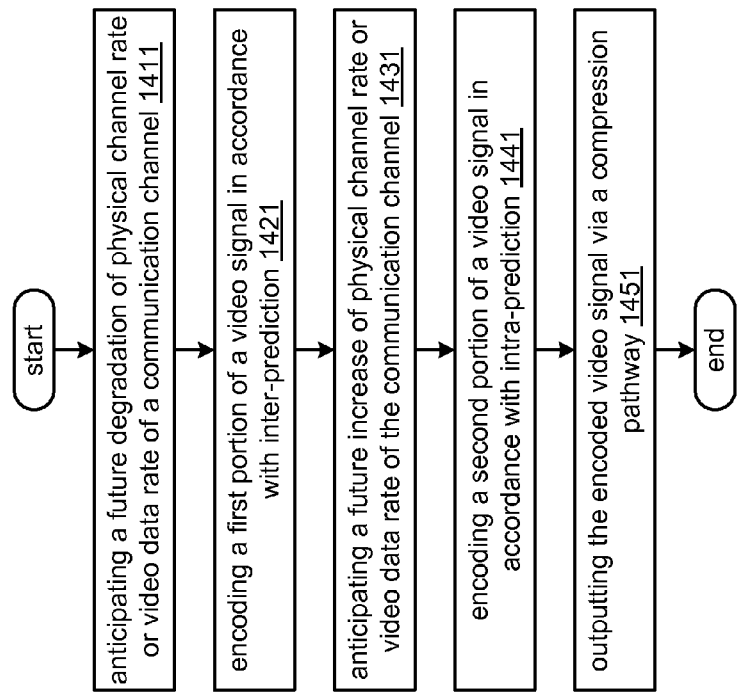
Figure 14A:
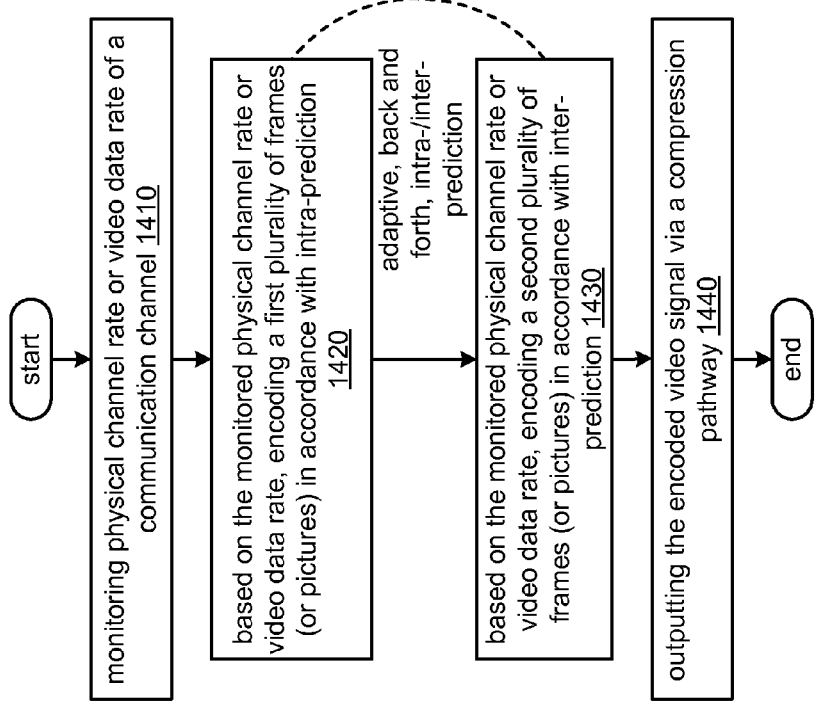

Referring to method 1400 of FIG. 14A, the method 1400 begins by monitoring a physical channel rate or video data rate of the communication channel, as shown in a block 1410. The method 1400 continues by encoding a first plurality of frames (or pictures) of a video signal in accordance with intra-prediction based on the monitored physical channel rate or video data rate, as shown in a block 1420. The method 1400 then operates by encoding a second plurality of frames (or pictures) of the video signal in accordance with inter-prediction based on the monitored physical channel rate or video data rate, as shown in a block 1430. In certain embodiments, the operations of the blocks 1420 and 1430 may be adaptive, back-and-forth, etc. such that encoding of different respective groups of frames (or pictures) of a video signal may be performed using various combinations of intra-prediction and inter-prediction. Also, with respect to the monitoring of the physical channel rate or video data rate of the communication channel as depicted within the block 1410, prediction of a future physical channel rate or video data rate of the communication channel and or a change thereof may also be one of the parameters by which adaptation and selectivity between intra-prediction and inter-prediction is performed in accordance with encoding of different respective groups of frames (or pictures) of a video signal.

The method 1400 continues by outputting the encoded video signal via a compression pathway, as shown in a block 1440.

Referring to method 1401 of FIG. 14B, the method 1401 begins by anticipating a future degradation of physical channel rate or video data rate of the communication channel, as shown in a block 1411. The method 1401 then operates by encoding a first portion of a video signal in accordance with inter-prediction, as shown in a block 1421. For example, as the actual physical channel rate or video data rate of the communication channel is anticipated to degrade, it may be decided that intra-prediction in accordance with video encoding of a video signal will no longer perform to an acceptable level of quality. In such an instance, switching to inter-prediction in accordance with video encoding may provide for the acceptable level of quality.

The method 1401 continues by anticipating a future increase of physical channel rate or video data rate of the communication channel, as shown in a block 1431. The method 1401 then operates by encoding a second portion of the video signal in accordance with intra-prediction, as shown in a block 1441.

For example, as the actual physical channel rate or video data rate of the communication channel is anticipated to improve, it may be decided that intra-prediction in accordance with video encoding of a video signal will perform properly and provide an acceptable level of quality, including one which may be better than that which is achieved using inter-prediction in certain situations. In such an instance, switching to intra-prediction in accordance with video encoding may be performed.

The method 1401 continues by outputting the encoded video signal via a compression pathway, as shown in a block 1451.

Referring to method 1500 of FIG. 15A, the method 1500 begins by anticipating a physical channel rate or video data rate of the communication channel falling below at least one particular threshold, as shown in a block 1510.

The method 1500 continues by encoding a first portion of a video signal in accordance with inter-prediction, as shown in a block 1520. For example, such encoding of the first portion of the video signal in accordance with inter-prediction may be made before the physical channel rate or video data rate of the communication channel actually falls below a threshold. That is to say, in one embodiment, such encoding is performed not based upon a detection of the physical channel rate or video data rate of the communication channel falling below a threshold, but it is instead based upon a prediction of the physical channel rate or video data rate of the communication channel as expecting to fall below the threshold at some future time.

The method 1500 then operates by anticipating the physical channel rate or video data rate of the communication channel rising above a second threshold (e.g., such that the second threshold being greater than the first threshold), as shown in a block 1530. In an alternative embodiment, the second threshold and the first threshold could be the same.

Again, as also described with respect to other embodiments, more than one threshold may be employed in accordance with making a best guess or estimate of a future video data rate or bit and/or symbol rate of a communication channel, of a future latency of a video stream (e.g., including considering buffer delay within a transmitter/encoder device), and/or a detected change of any one or more such operational parameters.

The method 1500 continues by encoding a second portion of the video signal in accordance with intra-prediction, as shown in a block 1540. For example, such encoding of the second portion of the video signal in accordance with intra-prediction may be made before the physical channel rate or video data rate of the communication channel actually rises above a threshold. For example, in one embodiment, such encoding is performed not based upon a detection of the physical channel rate or video data rate of the communication channel rising above the threshold, but is instead based upon a prediction of the physical channel rate or video data rate of the communication channel as expecting to rise above the threshold at some future time. In certain practical applications, it may be desirable not to perform intra-prediction coding until the available video data rate is sufficiently and acceptably high to support intra-prediction coding (e.g., perform inter-prediction coding only until the available video data rate is sufficiently and acceptably high to support intra-prediction coding).

The method 1500 then operates by outputting the encoded video signal via a compression pathway, as shown in a block 1550.

Also, while a given threshold is described with respect to this embodiment, it is noted that alternative embodiments may include more than one threshold that are either cooperatively employed or employed at different times. For example, a first threshold may be employed at or during a first time, a second threshold may be employed at or during a second time, etc.

Referring to method 1501 of FIG. 15B, the method 1501 begins by encoding a first portion of a video signal in accordance with no feedback (e.g., in accordance with neither inter-prediction nor intra-prediction), as shown in a block 1511. For example, the operation of the block 1511 operates in accordance with neither inter-prediction nor intra-prediction. In other embodiments, the 1501 could begin by encoding the first portion of the video signal in accordance with intra-prediction.

The method 1501 then operates by selectively encoding a second portion of a video signal in accordance with inter-prediction (or intra-prediction) in accordance with a first anticipated physical channel rate or video data rate of the communication channel, as shown in a block 1521. For example, if the first anticipated physical channel rate or video data rate is associated with an increase in the physical channel rate or video data rate (e.g., such as in accordance with comments above, in that, the physical channel rate or the available video data rate is or is expected to be sufficiently and acceptably high to support intra-prediction coding), then selective encoding may be performed in accordance with intra-prediction. Alternatively, if the first anticipated physical channel rate or video data rate is associated with a decrease in the physical channel rate or video data rate, then selective encoding may be performed in accordance with inter-prediction.

The method 1501 continues by selectively encoding a third portion of the video signal in accordance with intra-prediction (or inter-prediction) in accordance with a second anticipated physical channel rate or video data rate of the communication channel, as shown in a block 1531. For example, if the second anticipated physical channel rate or video data rate is associated with a decrease in the physical channel rate or video data rate than selective encoding may be performed in accordance with inter-prediction. Alternatively, if the second anticipated physical channel rate or video data rate is associated with an increase in the physical channel rate or video data rate, then selective encoding may be performed in accordance with intra-prediction.

Referring to method 1600 of FIG. 16, as also described and mentioned elsewhere with respect to other embodiments, there may be instances where it may be desirable and/or more practical to wait for or ensure that the physical channel rate or available video data rate of the communication channel is sufficiently or acceptably high enough to support one particular operational mode of video coding. For example, in one instance, it may be desirable and/or more practical to wait for or ensure that the physical data rate or available video data rate of the communication channel is above a particular value, or is expected to be above a particular value, before performing intra-prediction video coding. For example, video coding may be performed initially in accordance with inter-prediction (or in accordance with neither intra-prediction or inter-production) until the physical channel rate or available video data rate of the communication channel is above a particular value, or is expected to be above a particular value.

For example, considering the method 1600 of FIG. 16, the method 1600 begins by monitoring a physical channel rate or available video data rate of communication channel, as shown in a block 1610. Then, it is determined whether or not the physical channel rate or available video data rate is above a particular threshold, as shown in a decision block 1620. In certain situations, the operations of the block 1620 may correspond to determining whether or not the physical channel rate or available data rate is expected to be above a particular threshold (e.g., at some future time). If the physical channel rate or available video data rate of the communication channel compares favorably with this threshold (e.g., if it is above the threshold or is expected to be above the threshold), then encoding of the video signal may be performed in accordance with intra-prediction, or in accordance with a combination of intra-prediction and inter-prediction, as shown in a block 1640.

Alternatively, if the physical channel rate or available video data rate of the communication channel compares unfavorably with this threshold (e.g., if it is below the threshold or is expected to be below the threshold), then encoding of the video signal may be performed in accordance with inter-prediction, as shown in a block 1630. Of course, the encoding of the video signal may alternatively be performed in accordance with neither intra-prediction or inter-production, if desired in certain situations.

Generally speaking, if the physical channel rate or available video data rate is above or is expected to be above a value that is sufficient and acceptable for sporting intra-prediction video coding, then the video coding operations may be performed in accordance with any desired embodiment in which there is a switching back and forth between intra-prediction and inter-prediction. However, as can be seen with respect to this particular embodiment, intra-prediction may be precluded from being performed until the physical channel rate or available video data rate of the communication channel is adequately or acceptably high (e.g., such as in comparison with at least one threshold).

It is also noted that the various operations and functions as described with respect to various methods herein may be performed within a wireless communication device. For example, any one or more modules and/or circuitries within a wireless communication device may be operative to effectuate the various methods as described herein. For example, one such component within a wireless communication device may be a baseband processing module as described with reference to FIG. 2. Of course, any other modules and/or circuitries within such a device may also be used to effectuate such operations. Moreover, while multiple embodiments described herein are particularly related to wireless communication devices and wireless communication systems, it is noted that in accordance with various aspects, and their equivalents, of the invention may be equally applied to any other types of communication systems (e.g., wired communication systems, fiber-optic communication systems, etc.).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, for modulating, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. An apparatus comprising:
a video encoder configured to predict an available video data rate of a wireless communication channel based at least in part on a forward-looking anticipation of a change of the available video data rate without consideration of a size of an output bit stream by the video encoder, and in response, to adaptively encode a first portion of an input video signal using an intra-prediction operational mode and to adaptively encode a second portion of the input video signal using an inter-prediction operational mode to generate the output bit stream that corresponds to the input video signal; and
a radio configured to support wireless transmission of a signal that corresponds to the output bit stream via the wireless communication channel, wherein the adaptively encoding using the inter-prediction operational mode when the change of the available video data rate falls below a first threshold and the intra-prediction operational mode when the change of the available video data rate rises above a second threshold that is greater than the first threshold, the adaptively encoding based on the at least in part the forward-looking anticipation of the change of the available video data rate of the wireless communication channel.

2. The apparatus of claim 1, the first portion of the input video signal including a first plurality of pictures, and the second portion of the input video signal including a second plurality of pictures.

3. The apparatus of claim 1 further comprising:
the video encoder configured to adaptively encode a third portion of the input video signal using neither the inter-prediction operational mode nor the intra-prediction operational mode to generate the output bit stream that corresponds to the input video signal.

4. The apparatus of claim 1 further comprising:
a compression pathway configured to perform transformation, quantization, and entropy encoding in conjunction with the adaptively encoding being based on the intra-prediction and inter-prediction operational modes to generate the output bit stream.

5. The apparatus of claim 1 further comprising:
an access point (AP), wherein the radio is further configured to support wireless transmission of the signal that corresponds to the output bit stream via the wireless communication channel to a wireless station (STA).

6. An apparatus comprising:
a video encoder configured to predict an available video data rate of a wireless communication channel based on at least in part of a forward-looking anticipation of a change of the available video data rate without consideration of a size of an output bit stream by the video encoder, and in response to adaptively encode an input video signal using a plurality of operational modes that includes intra-prediction and inter-prediction operational modes to generate the output bit stream that corresponds to the input video signal; and
a radio configured to support wireless transmission of a signal that corresponds to the output bit stream via a wireless communication channel, wherein the adaptively encoding using the inter-prediction operational mode when the change of the available video data rate falls below a first threshold and the intra-prediction operational mode when the change of the available video data rate rises above a second threshold that is greater than the first threshold, the adaptively encoding based on the at least in part of the forward-looking anticipation of the change of the available video data rate of the wireless communication channel.

7. The apparatus of claim 6, wherein the available video data rate of the wireless communication channel corresponds to a maximum bit rate or a maximum channel rate that may be supported by the wireless communication channel.

8. The apparatus of claim 6 further comprising:
the video encoder configured to select the intra-prediction operational mode or the inter-prediction operational mode based on feedback that is based on a processed version of the input video signal.

9. The apparatus of claim 8 further comprising:
the video encoder configured to encode a first portion of the input video signal using intra-prediction; and
the video encoder configured to encode a second portion of the input video signal using inter-prediction.

10. The apparatus of claim 9, wherein the first portion of the input video signal includes a first plurality of pictures, and the second portion of the input video signal includes a second plurality of pictures.

11. The apparatus of claim 9 further comprising:
the video encoder configured to adaptively encode a third portion of the input video signal using neither the inter-prediction operational mode nor the intra-prediction operational mode.

12. The apparatus of claim 6 further comprising:
a compression pathway configured to perform transformation, quantization, and entropy encoding in conjunction with the adaptively encoding being based on the plurality of operational modes that includes intra-prediction and inter-prediction operational modes.

13. The apparatus of claim 6 further comprising:
an access point (AP), wherein the radio is further configured to support wireless transmission of the signal that corresponds to the output bit stream via the wireless communication channel to a wireless station (STA).

14. The apparatus of claim 6 further comprising:
a wireless station (STA), wherein the radio is further configured to support wireless transmission of the signal that corresponds to the output bit stream via the wireless communication channel to an access point (AP).

15. A method for execution by a communication device, the method comprising:
predicting an available video data rate of a wireless communication channel based at least in part on a forward-looking anticipation of a change of the available video data rate without consideration of a size of an output bit stream;
adaptively video encoding in response to the available video data rate, a first portion of an input video signal using an intra-prediction operational mode and a second portion of the input video signal using an inter-prediction operational mode to generate the output bit stream that corresponds to the input video signal such that the adaptively encoding using the inter-prediction operational mode when the change of the available video data rate falls below a first threshold and the intra-prediction operational mode when the change of the available video data rate rises above a second threshold that is greater than the first threshold, the adaptively encoding based on the at least in part of the-forward-looking anticipation of the change of the available video data rate of the wireless communication channel; and
operating a radio to support wireless transmission of a signal that corresponds to the output bit stream via a wireless communication channel.

16. The method of claim 15, wherein the first portion of the input video signal includes a first plurality of pictures, and the second portion of the input video signal including a second plurality of pictures.

17. The method of claim 15 further comprising:
adaptively video encoding a third portion of the input video signal using neither the inter-prediction operational mode nor the intra-prediction operational mode to generate the output bit stream that corresponds to the input video signal.

18. The method of claim 15 further comprising:
performing transformation, quantization, and entropy encoding in conjunction with the adaptively video encoding being based on the intra-prediction and inter-prediction operational modes to generate the output bit stream.

19. The method of claim 15, wherein the communication device includes an access point (AP); and further comprising:
operating the radio to support wireless transmission of the signal that corresponds to the output bit stream via the wireless communication channel to a wireless station (STA).

20. The method of claim 15, wherein the communication device includes a wireless station (STA); and further comprising:
operating the radio to support wireless transmission of the signal that corresponds to the output bit stream via the wireless communication channel to an access point (AP).

* * * * *